United States Patent
Minase et al.

(10) Patent No.: US 8,442,741 B2
(45) Date of Patent: May 14, 2013

(54) VEHICLE CONTROL APPARATUS

(75) Inventors: Yuki Minase, Susono (JP); Haruhiko Katsumata, Susono (JP); Michihito Shimada, Mishima (JP); Masashi Takagi, Nagoya (JP); Tsutomu Miyazaki, Miyoshi (JP); Toshiya Oishi, Nagoya (JP); Kenichi Okaya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/639,480

(22) PCT Filed: Apr. 7, 2010

(86) PCT No.: PCT/JP2010/002534
§ 371 (c)(1),
(2), (4) Date: Oct. 4, 2012

(87) PCT Pub. No.: WO2011/125122
PCT Pub. Date: Oct. 13, 2011

(65) Prior Publication Data
US 2013/0024090 A1 Jan. 24, 2013

(51) Int. Cl.
*F02D 45/00* (2006.01)
*G06F 19/00* (2011.01)

(52) U.S. Cl.
USPC .............. 701/102; 701/70; 701/110; 701/115

(58) Field of Classification Search .................. 701/102, 701/101, 110, 111, 115, 70, 78, 75, 83; 477/195, 477/199, 906
See application file for complete search history.

(56) References Cited

U.S. PATENT DOCUMENTS

| | | | |
|---|---|---|---|
| 5,612,880 A * | 3/1997 | Kojima et al. | 701/75 |
| 6,951,528 B2 * | 10/2005 | Ewinger et al. | 477/195 |
| 2011/0022284 A1 * | 1/2011 | Umakoshi et al. | 701/70 |
| 2011/0295480 A1 * | 12/2011 | Shimada et al. | 701/70 |
| 2012/0259524 A1 * | 10/2012 | Miyazaki et al. | 701/70 |

FOREIGN PATENT DOCUMENTS

| | | |
|---|---|---|
| JP | 62-051737 A | 3/1987 |
| JP | 64-021026 U | 2/1989 |
| JP | 07-019077 A | 1/1995 |
| JP | 2005-291030 A | 10/2005 |
| JP | 2005-306320 A | 11/2005 |

OTHER PUBLICATIONS

International Search Report of PCT/JP2010/002534 mailed May 18, 2010.

* cited by examiner

*Primary Examiner* — Hieu T Vo
(74) *Attorney, Agent, or Firm* — Kenyon & Kenyon LLP

(57) ABSTRACT

Disclosed is a vehicle control apparatus which can prevent drivability from being deteriorated. An ECU is operative to set a reduction speed threshold value to determine a driver's braking intention on the basis of the correlation in the depression amount of an accelerator pedal, the depression amount of a brake pedal, and a travel state of a vehicle caused by the depression amounts of the accelerator pedal and the brake pedal. The ECU is further operative to change the reduction speed threshold value on the basis of the detected drive state to compare the travel state calculated on the basis of the detected drive state with the changed reduction speed threshold value to determine the driver's braking intention, thereby making it possible to determine the driver's braking intention without detecting the operation amount of a driver and to accurately estimate the driver's braking intention. This makes it possible to change the reduction control between executed and not executed, and to improve the drivability.

11 Claims, 7 Drawing Sheets

FIG.5

|  |  | C1 | C2 | B1 | B2 | B3 | F |
|---|---|---|---|---|---|---|---|
| P |  | × | × | × | × | × | × |
| R |  | × | × | × | ○ | ○ | × |
| N |  | × | × | × | × | × | × |
| D | 1st | ○ | × | × | ◎ | × | △ |
|   | 2nd | ○ | × | ○ | × | × | × |
|   | 3rd | ○ | × | × | × | ○ | × |
|   | 4th | ○ | ○ | × | × | × | × |
|   | 5th | × | ○ | × | × | ○ | × |
|   | 6th | × | ○ | ○ | × | × | × |

○ ENGAGED   × DISENGAGED
◎ ENGAGED ONLY WHEN ENGINE BRAKE IS APPLIED
△ ENGAGED ONLY WHEN DRIVING

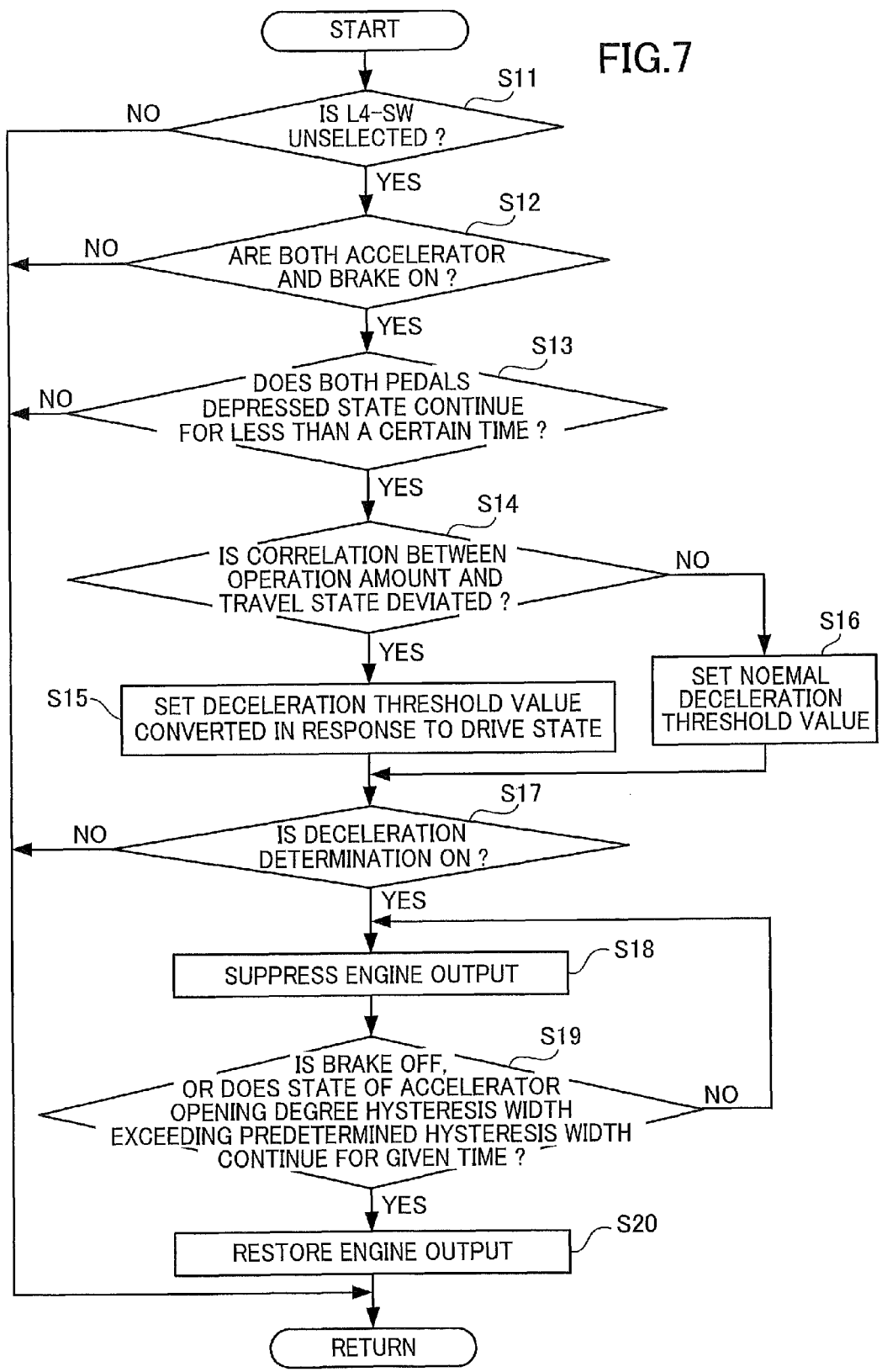

VEHICLE CONTROL APPARATUS

This is a 371 national phase application of PCT/JP2010/002534 filed 7 Apr. 2010, the contents of which are incorporated herein by reference.

TECHNICAL FIELD

The present invention relates to a vehicle control apparatus, and more particularly to a vehicle control apparatus that performs a suppressing control to the output of a power source.

BACKGROUND ART

In general, a vehicle has three fundamentally necessary abilities including a "driving force" as an ability of "advancing", a "steering force" as an ability of "turning", and a "braking force" as an ability of "stopping".

The "driving force" is a power, i.e., a torque generated by a power source of an internal combustion engine (hereinafter simply referred to as an "engine") in response to such an amount of depression of an accelerator pedal and transmitted through a transmission to driving wheels to be obtained as a frictional reaction force of the driving wheels and a road surface allowing the driving wheels to travel thereon. The "steering force" is obtained by a steering device capable of changing the advancing direction of, for example, front wheels in response to the operation amount of a steering wheel. The "braking force" is generated in response to the amount of depression of a brake pedal by slowing down or stopping the rotation of the driving wheels to generate a frictional reaction force of the driving wheels and the road surface allowing the vehicle to be stopped.

In general, the accelerator pedal and the brake pedal are located adjacent to each other in the neighborhood of the location of drivers' feet. Many drivers selectively depress the accelerator pedal or the brake pedal only with his or her right foot to control the "driving force" and the "braking force", viz., to control a vehicle speed.

In that case, for example, a vehicle with an automatic transmission (hereinafter simply referred to as an "AT car") is provided with no clutch pedal, thereby allowing some drivers to drive his or her car while depressing the brake pedal with his or her left foot and depressing the accelerator pedal with his or her right foot. In this way, there are some drivers who drive their cars separately using their left foot and right foot to depress the brake pedal and the accelerator pedal, respectively. For such drivers using their both feet separately for the brake pedal and the accelerator pedal, there is a possible case that the brake pedal is depressed while the accelerator pedal is not being released by the driver, or otherwise the accelerator pedal is depressed while the brake pedal is not being released by the driver.

The driver's intention is not limited at all times to be directed to the speed reduction of the vehicle. Therefore, there are some cases in which the simultaneous depressions of the accelerator pedal and the brake pedal as previously mentioned are apt to lead to deterioration in drivability.

There has so far been known a vehicle control apparatus which can reduce an output of the engine in the event that the accelerator pedal and the brake pedal are depressed at the same time (see, for example, Patent Document 1).

The previously mentioned conventional vehicle is constructed to reduce the torque outputted by the engine with the fuel injection amount of the engine being temporarily reduced in the case that the accelerator pedal and the brake pedal are depressed at the same time.

CITATION LIST

Patent Literature

{Patent Document 1}
Japanese Patent Application Publication No. S62-051737

SUMMARY OF INVENTION

Technical Problem

However, the conventional vehicle control apparatus is constructed to uniformly reduce the fuel injection amount to the engine and thereby reduce the torque irrespective of the vehicle travel state when the accelerator pedal and the brake pedal are depressed by the driver at the same time. Such a reduction of torque is carried out notwithstanding the driver's intention. This results in the fact that the intentionally simultaneous depressions of the accelerator pedal and the brake pedal by the driver generates a hesitation and other unfavorable phenomena on the vehicle, thereby leading to problems such as deteriorated drivability.

In view of such a problem, it has been considered that the driver's intention is estimated by detecting the operation amounts of the accelerator pedal and the brake pedal to perform the output control of the engine only when the driver's intention is determined to be recognized by the apparatus. It is, however, required for sensors to detect the operation amounts of the accelerator pedal and the brake pedal in order to detect the operation amounts of the accelerator pedal and the brake pedal to estimate the driver's intention. Here, the brake depression sensors for detecting the operation amount of the brake pedal are expensive, and thus are in reality not mounted on an inexpensive vehicle. The method of estimating the driver's braking intention with the operation amounts previously mentioned has not been applied to all kinds of vehicles, thereby making it impossible to improve the drivability for all kinds of vehicles.

The present invention has been made to solve such conventional problems as previously mentioned. It is therefore an object of the present invention to provide a vehicle control apparatus which can prevent the drivability from being deteriorated.

Solution to Problem

To solve the foregoing problems, the vehicle control apparatus according to the present invention, (1) for a vehicle provided with a drive source, an accelerator pedal, and a brake pedal, the vehicle control apparatus comprises a drive state detection unit that detects a drive state of the vehicle including a driving force request amount of a driving force outputted from the drive source, an output control unit that executes a reduction control of reducing the driving force outputted from the drive source with respect to the driving force request amount, and a threshold value setting unit that sets a determination threshold value to determine a driver's braking intention on the basis of the correlation between the driving force request amount and the braking force request amount requested by a driver, and a travel state of the vehicle caused by the driving force request amount and the braking force request amount, the drive state detection unit having an accelerator detection unit that detects the depression of the accelerator pedal, and a brake detection unit that detects the depression of the brake pedal, the threshold value setting unit being operative to change the determination threshold value on the basis of the drive state detected by the drive state detection unit, and the output control unit being operative to execute the reduction control when the depression of the accelerator pedal is detected by the accelerator detection unit, the depression of the brake pedal is detected by the brake detection unit, and the driver's braking intention is determined by comparing the travel state calculated on the basis of the drive state detected by the drive state detection unit with the determination threshold value, and not to execute the reduction control when the depression of the accelerator pedal is not detected by the accelerator detection unit, or when the depression of the brake pedal is not detected by the brake detection unit, or when no driver's braking intention is determined by the output control unit.

By the construction as set forth in the above definition (1), the vehicle control apparatus is operative to set the threshold determination value to determine the driver's braking intention on the basis of the correlation between the driving force request amount and the braking force request amount requested by the driver, and the travel state of the vehicle caused by the driving force request amount and the braking force request amount, as well as to change the determination threshold value on the basis of the detected drive state, and to determine the driver's braking intention by comparing the travel state calculated on the basis of the detected drive state with the changed determination threshold value. This makes it possible to estimate the driver's braking intention on the basis of the travel state calculated from the drive state of the vehicle without detecting the operation amount of the driver, as well as to determine the driver's braking intention on the basis of the travel state varied in response to the factors other than the operation amount of the driver, so that the driver's intention can accurately be estimated to have the reduction control changed selectively to be executed or not to be executed, thereby making it possible to improve the drivability.

The vehicle control apparatus according to the present invention as set forth in the above definition (1), in which (2) the threshold value setting unit is operative to define an acceleration of the vehicle as the travel state of the vehicle to set the determination threshold value of the acceleration, and to change the determination threshold value of the acceleration on the basis of the drive state detected by the drive state detection unit, and the output control unit is operative to compare the acceleration calculated on the basis of the drive state detected by the drive state detection unit with the determination threshold value of the acceleration to determine the driver's braking intention.

By the construction as set forth in the above definition (2), the vehicle control apparatus is operative to define the acceleration as the travel state of the vehicle to set the determination threshold value of the acceleration, and to change the determination threshold value of the acceleration on the basis of the drive state to determine the driver's braking intention by comparing the acceleration calculated on the basis of the detected drive state with the determination threshold value of the acceleration. This makes it possible to change on the basis of the drive state the correlation between the driving force request amount and the braking force request amount of the driver, and the acceleration caused by the driving force request amount and the braking force request amount of the driver to determine the driver's braking intention, so that the driver's intention can accurately be estimated to have the reduction control changed selectively to be executed or not to be executed, thereby making it possible to improve the drivability.

The vehicle control apparatus according to the present invention as set forth in the above definition (1) or (2), in which (3) the threshold value setting unit is operative to define the vehicle speed of the vehicle as the travel state of the vehicle to set the determination threshold value of the vehicle speed, and to change the determination threshold value of the vehicle speed on the basis of the drive state detected by the drive state detection unit, and the output control unit is operative to compare the vehicle speed calculated on the basis of the drive state detected by the drive state detection unit with the determination threshold value of the vehicle speed to determine the driver's braking intention.

By the construction as set forth in the above definition (3), the vehicle control apparatus is operative to define the vehicle speed as the travel state of the vehicle to set the determination threshold value of the vehicle speed, and to change the determination threshold value of the vehicle speed on the basis of the drive state and is further operative to compare the vehicle speed calculated on the basis of the detected drive state with the determination threshold value of the vehicle speed to determine the driver's braking intention. This makes it possible to change on the basis of the drive state the correlation between the driving force request amount and the braking force request amount of the driver, and the vehicle speed caused by the driving force request amount and the braking force request amount of the driver to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (3), in which (4) the drive state detection unit has a negative pressure detection unit that detects a negative pressure in a booster to assist the depression of the brake pedal by utilizing the negative pressure, and the threshold value setting unit is operative to change the determination threshold value on the basis of the negative pressure detected by the negative pressure detection unit.

In general, the depression of the brake pedal in the state of the accelerator pedal being depressed leads to the negative pressure of the booster being lost, thereby decreasing the braking force with respect to the depression force of the brake pedal. By the construction as set forth in the above definition (4), the vehicle control apparatus is operative to detect the negative pressure of the booster and to change the determination threshold value on the basis of the negative pressure, so that the correlation between the braking force request amount of the driver and the braking force caused by the braking force request amount of the driver can appropriately be changed and thus the driver's braking intention can be determined. This makes it possible to accurately estimate the driver's intention to have the reduction control changed selectively to be executed or not to be executed, thereby making it possible to improve the drivability.

The vehicle control apparatus according to the present invention as set forth in any one of the above definitions (1) to (4), in which (5) the drive state detection unit has a brake pedal depression number detection unit that detects the number of the brake pedal depressions, and the threshold value setting unit is operative to change the determination threshold value on the basis of the number of the brake pedal depressions detected by the brake pedal depression number detection unit.

In general, the frequent depressions of the brake pedal in the state of the accelerator pedal being depressed leads to the negative pressure of the booster being lost more and more, thereby further decreasing the braking force with respect to the depression force of the brake pedal. By the construction as set forth in the above definition (5), the vehicle control apparatus is operative to detect the number of the brake pedal depressions and to change the determination threshold value on the basis of the number of the brake pedal depressions, so that the correlation between the braking force request amount of the driver and the braking force caused by the braking force request amount of the driver can appropriately be changed and thus the driver's intention can be determined. This makes it possible to accurately estimate the driver's intention to have the reduction control changed selectively to be executed or not to be executed, thereby making it possible to improve the drivability.

The vehicle control apparatus according to the present invention as set forth in any one of the above definitions (1) to (5), in which (6) the drive state detection unit has a vehicle inclination detection unit that detects a vehicle inclination state, and the threshold value setting unit is operative to change the determination threshold value on the basis of the vehicle inclination state detected by the vehicle inclination detection unit.

In general, the travel states are different from each other depending upon the inclinations at the positions of the vehicle even if the driving forces and the braking forces with respect to the vehicle are identical to each other. By the construction as set forth in the above definition (6), the vehicle control apparatus is operative to detect the inclination state of the vehicle and to change the determination threshold value on the basis of the detected inclination state, so that the inclination of the position of the vehicle can be estimated. This makes it possible to appropriately change on the basis of the correlation between the driving force request amount and the braking force request amount of the driver, and the driving force and the braking force caused by the driving force request amount and the braking force request amount to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (6), in which (7) the drive state detection unit has a gradient detection unit that detects vehicle position information of the vehicle to detect a gradient of the vehicle position on the basis of the vehicle position information and map information preliminarily memorized, and the threshold value setting unit is operative to change the determination threshold value on the basis of the gradient state of the vehicle position detected by the gradient detection unit.

In general, the travel states are different from each other depending upon the gradients at the positions of the vehicle even if the driving forces and the braking forces with respect to the vehicle are identical to each other. By the construction as set forth in the above definition (7), the vehicle control apparatus is operative to detect vehicle position information of the vehicle to detect a gradient of the vehicle position on the basis of the vehicle position information and the map information preliminarily memorized and to change the determination threshold value on the basis of the detected gradient state of the position of the vehicle. This makes it possible to appropriately change the correlation between the driving force request amount and the braking force request amount of the driver, and the driving force and the braking force caused by the driving force request amount and the braking force request amount by the detected gradient to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (7), in which (8) the drive state detection unit has a vehicle weight detection unit that detects a vehicle weight of the vehicle, and the threshold value setting unit is operative to change the determination threshold value on the basis of the vehicle weight detected by the vehicle weight detection unit.

In general, the travel states are different from each other depending upon the weights of the vehicle even if the driving forces and the braking forces with respect to the vehicle are identical to each other. By the construction as set forth in the above definition (8), the vehicle control apparatus is operative to detect a vehicle weight of the vehicle, and to change the determination threshold value on the basis of the detected vehicle weight. This makes it possible to appropriately change the correlation between the driving force request amount and the braking force request amount of the driver, and the driving force and the braking force caused by the driving force request amount and the braking force request amount by the detected vehicle weight to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (8), in witch (9) the drive state detection unit has a vehicle towing information detection unit that detects vehicle towing information of the vehicle, and the threshold value setting unit is operative to change the determination threshold value on the basis of the vehicle towing information detected by the vehicle towing information detection unit.

In general, the travel states are different from each other depending upon whether or not being towed by other vehicles even if the driving forces and the braking forces with respect to the vehicle are identical to each other. By the construction as set forth in the above definition (9), the vehicle control apparatus is operative to detect vehicle towing information of the vehicle, and to change the determination threshold value on the basis of the detected vehicle towing information. This makes it possible to appropriately change the correlation between the driving force request amount and the braking force request amount of the driver, and the driving force and the braking force caused by the driving force request amount and the braking force request amount by the detected vehicle towing information to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (9), in which (10) the drive state detection unit has an atmospheric pressure detection unit that detects an atmospheric pressure, and the threshold value setting unit is operative to change the determination threshold value on the basis of the atmospheric pressure detected by the atmospheric pressure detection unit.

By the construction as set forth in the above definition (10), the vehicle control apparatus is operative to detect the atmospheric pressure, and to change the determination threshold value on the basis of the detected atmospheric pressure, so that the correlation between the driving force request amount and the braking force request amount of the driver, and the driving force and the braking force caused by the driving force request amount and the braking force request amount can appropriately be changed by the detected atmospheric pressure even if there are possibilities that the amount of intake air of the engine, especially the amount of oxygen required for combustion is changed to have the driving force changed for example by the varied atmospheric pressure, and that the extremely light weight vehicle has the braking force affected by the varied atmospheric pressure. This makes it possible to determine the driver's braking intention, so that the driver's intention can accurately be estimated to have the reduction control changed selectively to be executed or not to be executed, thereby making it possible to improve the drivability.

The vehicle control apparatus according to the present invention as set forth in any one of the above definitions (1) to (10), in which (11) the drive state detection unit has an elevation detection unit that detects the vehicle position information of the vehicle to detect an elevation of the vehicle position on the basis of the vehicle position information and map information preliminarily memorized, and the threshold value setting unit is operative to change the determination threshold value on the basis of the elevation of the vehicle position detected by the elevation detection unit.

By the construction as set forth in the above definition (11), the vehicle control apparatus is operative to detect the vehicle position information of the vehicle to detect the elevation of the vehicle position on the basis of the vehicle position information and the map information preliminarily memorized, and to change the determination threshold value on the basis of the detected elevation of the vehicle position, so that the correlation between the driving force request amount and the braking force request amount of the driver, and the driving force and the braking force caused by the driving force request amount and the braking force request amount can appropriately be changed by the detected elevation of the vehicle or the atmospheric pressure to be estimated by the detected elevation of the vehicle even if the atmospheric pressure is changed by the elevation of the vehicle. This makes it possible to determine the driver's braking intention, so that the driver's intention can accurately be estimated to have the reduction control changed selectively to be executed or not to be executed, thereby making it possible to improve the drivability.

Advantageous Effects of Invention

The present invention can provide a vehicle control apparatus which can accurately estimate the driver's intention to have the reduction control changed selectively to be executed or not to be executed, thereby making it possible to improve the drivability.

BRIEF DESCRIPTION OF DRAWINGS

FIG. 5 is an operation table showing the engagement states of frictional engagement elements to realize each shift stage in the embodiment of the present invention.

FIG. 7 is a flowchart showing a vehicle control process in the embodiment of the present invention.

DESCRIPTION OF EMBODIMENTS

The embodiments of the invention will be described hereinafter with reference to the accompanying drawings. First, the construction of a vehicle having a control apparatus according to the embodiment of the present invention will be described with reference to the schematic block diagram of the vehicle shown in FIG. 1 and the schematic block diagram of the vehicle control shown in FIG. 2.

Figure 1:
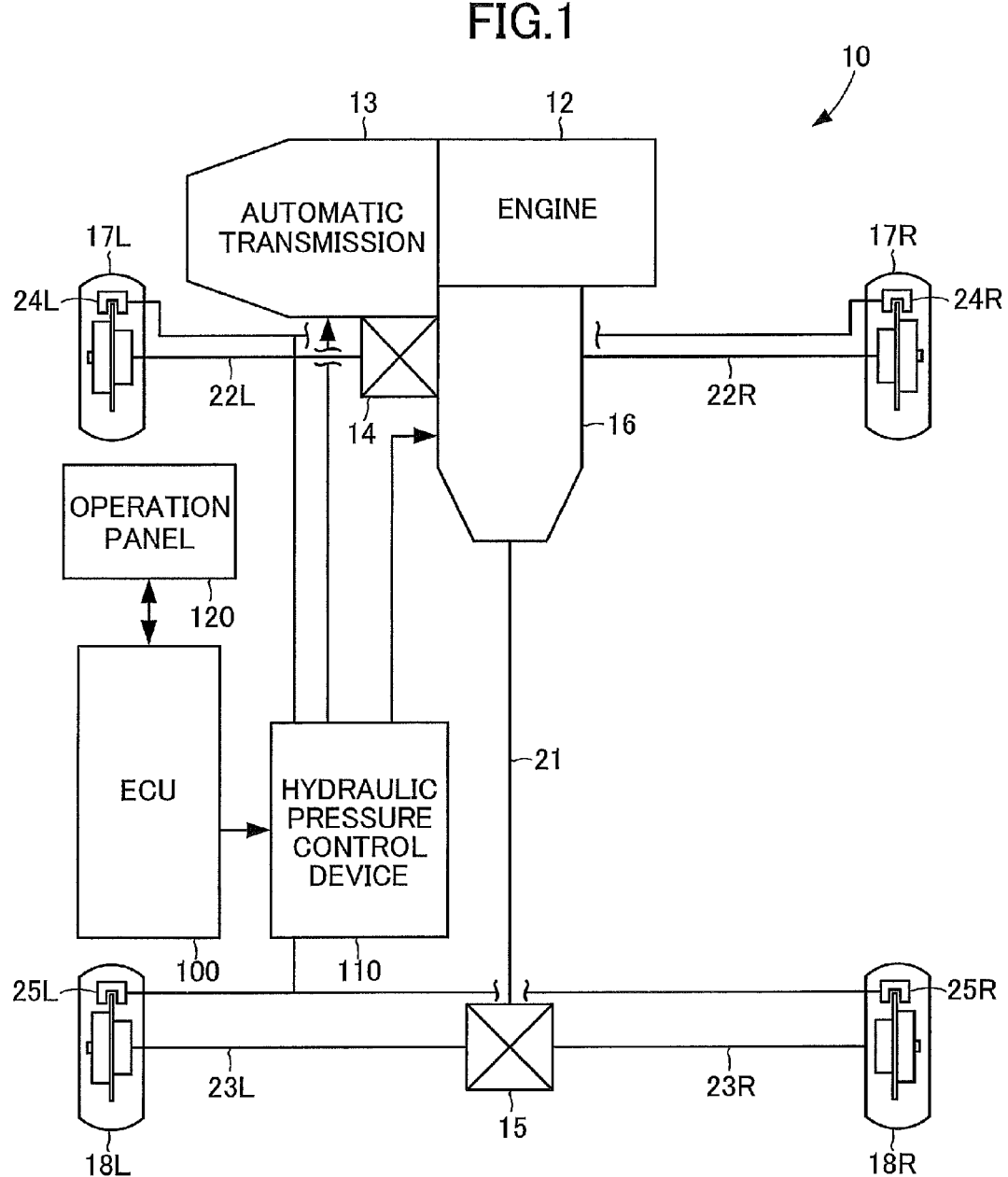
FIG. 1 is a schematic block diagram of a vehicle equipped with a control apparatus according to an embodiment of the present invention.

As shown in FIG. 1, a vehicle 10 according to the present embodiment comprises an engine 12 serving as a power source, an automatic transmission 13 that transmits a torque generated by the engine 12 and forms transmission stages corresponding to the travel states of the vehicle 10, a front differential mechanism 14 that distributes the torque transmitted from the automatic transmission 13 to left and right front drive shafts 22L, 22R, a rear differential mechanism 15 that distributes the torque transmitted by a propeller shaft 21 to left and right rear drive shafts 23L, 23R, a transfer 16 that distributes the torque transmitted by the automatic transmission 13 to front wheels 17L, 17R and rear wheels 18L, 18R, brake devices 24L, 24R that brakes the front wheels 17L, 17R, respectively, and brake devices 25L, 25R that brakes the rear wheels 18L, 18R, respectively.

Further, the vehicle 10 comprises an ECU (Electronic Control Unit) 100 serving as a vehicle electronic control unit that controls the entire vehicle 10, a hydraulic pressure control device 110 that hydraulically controls the automatic transmission 13 and the transfer 16, an operation panel 120 serving as an input/output interface with the driver, and a navigation system 170.

Figure 2:
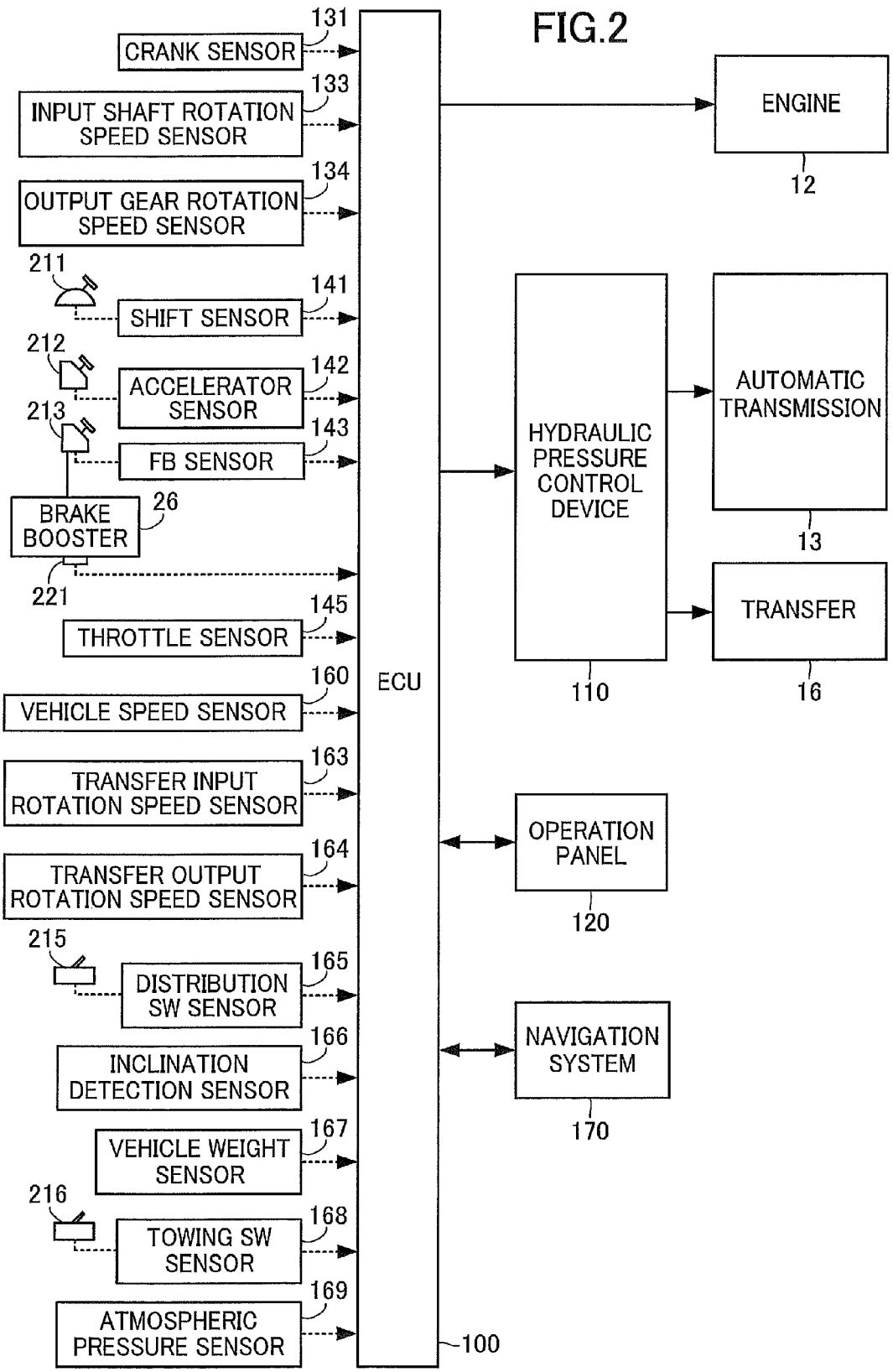
FIG. 2 is a schematic block diagram of the vehicle control according to the embodiment of the present invention.

Further, as shown in FIG. 2, the vehicle 10 is provided with a crank sensor 131, an input shaft rotation speed sensor 133, an output gear rotation speed sensor 134, a shift sensor 141, an accelerator sensor 142, a foot brake sensor 143 (hereinafter simply referred to as a "FB sensor"), a throttle sensor 145, a vehicle speed sensor 160, a transfer input rotation speed sensor 163, a transfer output rotation speed sensor 164, a distribution SW sensor 165, a inclination detection sensor 166, a vehicle weight sensor 167, a towing SW sensor 168, an atmospheric pressure sensor 169, a negative pressure sensor 221, and various kinds of other sensors not shown in the drawings. The previously mentioned sensors are adapted to output their detection signals to the ECU 100.

The engine 12 is constituted by a known power device which can output torque by combusting in a combustion chamber of a cylinder not shown a mixture of hydrocarbon fuel such as gasoline or diesel and air. The engine 12 is operated to intermittently repeat the actions of taking in the air mixture into the combustion chamber of the cylinder, combusting the mixture in the cylinder, and discharging exhaust gas to the outside of the cylinder to reciprocate a piston in the cylinder to enable a crank shaft drivably coupled to the piston to be rotated, thereby transmitting the torque to the automatic transmission 13. The fuel to be used for the engine 12 may be an alcohol fuel including an alcohol such as ethanol.

The automatic transmission 13 includes a plurality of planetary gear devices each provided with a plurality of friction engagement elements constituted by clutches and brakes and operative to be selectively engaged or disengaged, thereby forming a plurality of transmission stages in response to the combination of the engagement and disengagement of the clutches and the brakes. The clutches and the brakes are constructed to be switched selectively into their engaged states or their disengaged states by the hydraulic pressure control device 110.

By this construction, the automatic transmission 13 functions as a staged transmission to reduce or increase the torque or rotation of the crank shaft of the engine 12 inputted as a driving force at a predetermined speed change ratio $\gamma$ to be outputted to the front differential mechanism 14 and the transfer 16. This means that the automatic transmission 13 constitutes a plurality of speed change stages operable in response to the vehicle travel states and thus can carry out a speed conversion in response to the speed change stages. The detailed explanation about the automatic transmission 13 will be described later. The automatic transmission 13 may be composed of a continuously variable transmission by continuously changing the transmission speed change ratio.

The front differential mechanism 14 is operative to allow the rotation speed to be different between the front wheels 17R and 17L when the vehicle is travelling on a curved road. The front differential mechanism 14 comprises a plurality of gears to distribute and output the torque inputted by the automatic transmission 13 to the front drive shafts 22L, 22R. The front differential mechanism 14 may be constructed to have the front drive shafts 22L, 22R rotated at the same rotation speed, and thus may be operated under a diff-locked state having no difference in rotation speed between the front wheels 17L, 17R. The detailed explanation about the front differential mechanism 14 will be described hereinafter.

The rear differential mechanism 15 is substantially the same in construction as the front differential mechanism 14, so that the explanation about the rear differential mechanism 15 will be omitted.

The transfer 16, also known as an auxiliary transmission, serves to distribute and transmit the torque transmitted by the automatic transmission 13 to the front differential mechanism 14 and the rear differential mechanism 15. This means that the torque transmitted by the automatic transmission 13 can be distributed and transmitted by the transfer 16 to the front wheels 17L, 17R and the rear wheels 18L, 18R.

The vehicle 10 in the present embodiment is exemplified as a front-wheel driving vehicle in which the front wheels 17L, 17R serve as driving wheels at the time of a normal drive state when a four-wheel drive state is not selected. The transfer 16 is operative in the normal drive state and the four-wheel drive state as described hereinafter. This means that the transfer 16 can be operated at the normal drive state to transmit the torque transmitted by the automatic transmission 13 only to the front differential mechanism 14 but not to the rear differential mechanism 15. Further, the transfer 16 can be operated at the four-wheel drive state to distribute and transmit the torque transmitted by the automatic transmission 13 to the front differential mechanism 14 and the rear differential mechanism 15. The detailed description about the transfer 16 will become apparent as the description proceeds.

The brake devices 24L, 24R and the brake devices 25L, 25R are adapted to be operated by a brake master cylinder hydraulically connected with brake actuators, and brake units not shown in the drawings. The brake master cylinder is constructed to generate a hydraulic pressure in response to a depression amount of a foot brake pedal 213. The hydraulic pressure generated by the brake master cylinder is transmitted to the respective brake units through the respective brake actuators. The brake units are adapted to convert the transmitted hydraulic pressure to a mechanical force and to brake the front wheels 17L, 17R and the rear wheels 18L, 18R.

Between the foot brake pedal 213 and the brake master cylinder, is provided a brake booster 26 which helps a brake depression force Bf of the driver by utilizing the difference between an intake negative pressure of the engine and the atmospheric pressure.

The brake booster 26 has a cylindrical cylinder structure, and is separated inside into two chambers by a booster piston. Hereinafter, out of the two chambers of the brake booster 26 separated by the booster piston, one chamber of the foot brake pedal 213 side is referred to as a pedal side chamber, and the other chamber of the brake master cylinder side is referred to as a cylinder side chamber. The brake booster 26 is provided with the negative pressure sensor 221 which detects the negative pressure in the cylinder side chamber.

The booster piston is equipped with a push rod which penetrates the brake booster 26. The push rod has one end connected to an operation point of a shaft of the brake pedal 213 and has the other end connected to a piston of the brake master cylinder. In addition, the push rod is adapted to be capable of operating a valve to selectively switch pipes to the atmospheric pressure and to the intake negative pressure.

The brake booster 26 has both sides of the pedal side chamber and the cylinder side chamber which are in communication with intake pipes of the engine 12, and is adapted to introduce the intake negative pressure therein, when the foot brake pedal 213 is not depressed. In this state, the booster piston has the same pressures at both sides each other, so that the booster piston does not move to keep a neutral position.

On the other hand, when the foot brake pedal 213 is depressed, the depression force is transmitted to the piston of the brake master cylinder by the push rod penetrating the brake booster 26. At this time, the brake booster 26 has the valve switched to stop the introduction of the intake negative pressure to the pedal side chamber, and to introduce the atmosphere therein. The brake master cylinder has the intake negative pressure introduced to the cylinder side chamber, so that the booster piston is operated to move to the brake master cylinder side by the difference between the atmospheric pressure and the intake negative pressure. Therefore, the brake booster 26 can transmit the force to push the push rod, viz., the force stronger than the suppression force of the foot brake pedal 213 to the piston of the brake master cylinder.

The negative pressure sensor 221 is adapted to detect the pressure in the cylinder side chamber of the brake booster 26 and to output a detection signal indicative of the detected pressure to the ECU 100 under the control of the ECU 100.

The ECU 100 comprises a CPU (Central Processing Unit) as a central processing unit, a ROM (Read Only Memory) for storing therein fixed data, a RAM (Random Access Memory) for storing data therein temporarily, an EEPROM (Electrically Erasable and Programmable Read Only Memory) made of a rewritable non-volatile memory, and an I/O interface circuit, and is designed to carry out the overall control of the vehicle 10.

As will be stated below, the ECU 100 is connected to the crank sensor 131, the accelerator sensor 142, and the other sensors. The ECU 100 is adapted to receive detection signals outputted from these sensors to detect an engine rotation speed Ne, an accelerator opening degree Acc, and the others.

Further, the ECU 100 is adapted to control the hydraulic pressure control device 110 which can control the hydraulic pressure for the parts of the automatic transmission 13 and the transfer 16. However, the characteristic functions of the ECU 100 will be described hereinafter.

In addition, the ROM of the ECU 100 is adapted to store therein an operation table to be used for realizing the transmission stages, and a program for performing the vehicle control as described hereinafter. Further, the ROM of the ECU 100 is adapted to store therein a throttle opening degree control map, a gear shifting diagram, a lock-up control map, and various other values of the vehicle 10 which will not be described in detail hereinafter.

Furthermore, the ROM of the ECU 100 is adapted to store therein an accelerator pedal depression determination value Acc_tv, a deceleration threshold value map, deceleration threshold value calculation formulae, an output reducing accelerator opening degree Acn, and the like as necessary. Here, the deceleration threshold value calculation formulae are assumed to include a deceleration threshold value conversion formula described hereinafter as well as a formula to calculate the deceleration threshold value.

The accelerator pedal depression determination value Acc_tv is indicative of a determination value that determines whether or not the vehicle 10 is under an accelerator "on" state or an accelerator "off" state in response to a depression amount of an accelerator pedal 212.

The deceleration threshold value map is a map that determines the deceleration threshold value in response to the vehicle speed V and the accelerator opening degree Acc of the vehicle 10. Here, the deceleration threshold value is indicative of a threshold value that determines the driver's braking intention on the basis of the correlation between the depression amount of the accelerator pedal 212 and the depression amount of the foot brake pedal 213, and a travel state of the vehicle 10 caused by the depression amount of the accelerator pedal 212 and the depression amount of the foot brake pedal 213. More specifically, the deceleration threshold value map is a two dimensional table having the deceleration threshold value set for each of the predetermined values of vehicle speed V and accelerator opening degree Acc. The deceleration threshold value is indicative of a determination value of an acceleration $\alpha r$ that determines whether or not the vehicle 10 is in deceleration state. The acceleration $\alpha r$, which will be described hereinafter, is calculated by the ECU 100 with a time variation of a vehicle speed V detected by the vehicle speed sensor 160.

The ECU 100 is adapted to determine the deceleration threshold value from the detected vehicle speed V and the accelerator opening degree Acc on the basis of the deceleration threshold value map. If the detected vehicle speed V and the accelerator opening degree Acc have values which are not set in the deceleration threshold value map, the ECU 100 is adapted to determine the deceleration threshold value, for example, by interpolating the values with linear conversion from other values set in the deceleration threshold value map.

The ECU 100 is adapted to determine that the vehicle 10 is in the deceleration state if the acceleration $\alpha r$ is less than or equal to the determined deceleration threshold value, and to determine that the vehicle 10 is not in the deceleration state if the acceleration $\alpha r$ is larger than the determined deceleration threshold value.

Figure 3:
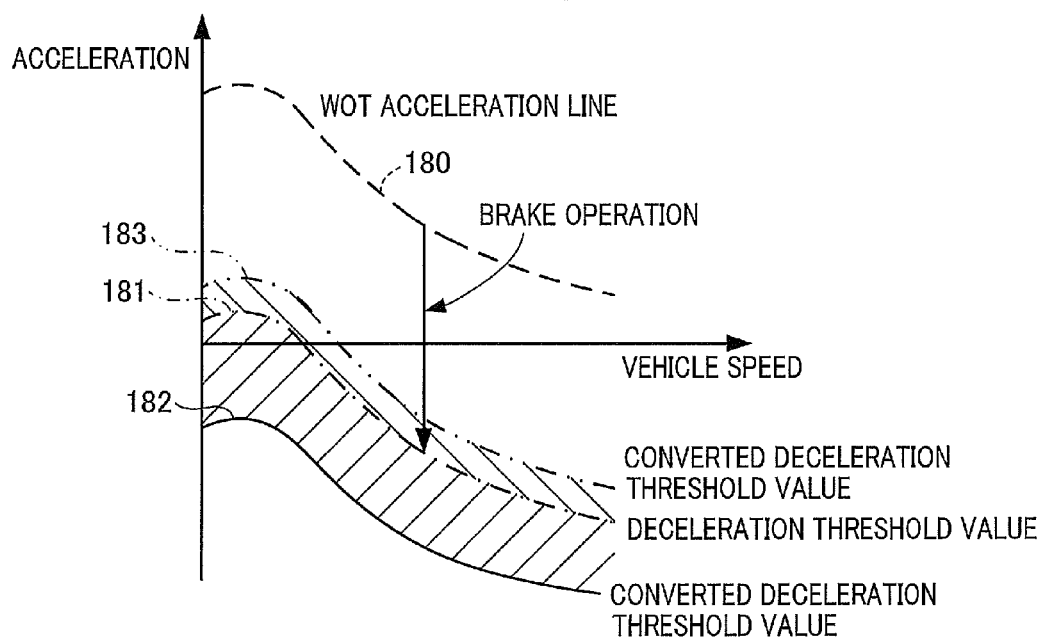
FIG. 3 is a graph showing speed reduction threshold values to be set by a speed reduction threshold value map in the embodiment of the present invention.

FIG. 3 is a graph showing the deceleration threshold values set by the deceleration threshold value map in a case that the accelerator opening degree Acc is the maximum. Hereinafter, WOT (Wide Open Throttle) means that the accelerator opening degree Acc is the maximum.

The deceleration threshold value calculation formulae are assumed to be calculation formulae in a case that the deceleration threshold value is calculated in response to the vehicle speed V and the accelerator opening degree Acc of the vehicle 10. For example, the deceleration threshold value calculation formula that calculates the deceleration threshold value is a formula that represents a one-dot chain line 181 indicating the deceleration threshold values shown in FIG. 3. Further, the deceleration threshold values converted by the deceleration threshold value conversion formula are shown with a curved line representing a solid line 182 in FIG. 3 or a two-dot chain line 183 in FIG. 3. For example, the deceleration threshold values are converted by the deceleration threshold value conversion formula to a curved line representing the solid line 182 in FIG. 3 when the vehicle 10 is travelling on an uphill, and the deceleration threshold values are converted by the deceleration threshold value conversion formula to a curved line representing the two-dot chain line 183 in FIG. 3 when the vehicle 10 is travelling on a downhill. In addition, a dashed line 180 is indicative of the acceleration $\alpha r$ at the vehicle speed V in a case that the foot brake pedal 213 is not depressed in the WOT state.

The ECU 100 has to store in the ROM either one of the deceleration threshold value map or the deceleration threshold value calculation formula. The ECU 100 may have the deceleration threshold value set by the deceleration threshold value map different from the deceleration threshold value set by the deceleration threshold value calculation formula, so that the ECU 100 may have both of the deceleration threshold value map and the deceleration threshold value calculation formula to select one of them in response to the conditions of travel state and the like.

The output reducing accelerator opening degree Acn is supposed to be an accelerator opening degree set for reducing the output of the engine 12 from an actual accelerator opening degree Acc when the control permission condition, as described hereinafter, is established. The output reducing accelerator opening degree Acn may also be calculated in response to the travel state of the vehicle 10.

The hydraulic pressure control device 110 comprises linear solenoid valves SLT, SLU, an on-off solenoid valve SL, and linear solenoid valves SL1 to SL5, each of which is constituted by an electromagnetic valve to be controlled by the ECU 100. The hydraulic pressure control device 110 is adapted to be controlled by the ECU 100 to operate the above solenoid valves, so that the hydraulic circuit is switched and hydraulically controlled to operate the whole parts of the automatic transmission 13. Therefore, the hydraulic pressure control device 110 is adapted to control the solenoid valves so that the solenoid valves can be switched to establish a desired transmission stage in the automatic transmission 13.

The operation panel 120 is operably connected with the ECU 100 to receive operational requests inputted by the driver, to perform operational assistances to the driver, and to display vehicle travel states and others. For example, when the driver inputs one of the travel modes using switches and the like provided on the operation panel 120, the I/O interface of the ECU 100 is inputted with the signal indicative of the travel mode inputted by the driver.

The navigation system 170 comprises a map information storage section for storing map information including topographic information, a current position acquisition section using GPS (Global Positioning System) to obtain the current position of the vehicle 10, and a display section to display information to the driver. By this configuration, the navigation system 170 is adapted to obtain information of an elevation and a gradient of the current position of the vehicle 10. In addition, the navigation system 170 is adapted to guide the driver from the current position to the destination in a similar manner to the car navigation systems known in the art.

The crank sensor 131 is adapted to detect the rotation speed of a crank shaft 24 and to output a detection signal indicative of the detected rotation speed to the ECU 100 under the control of the ECU 100. The ECU 100 is adapted to obtain as an engine rotation speed Ne the rotation speed of the crank shaft 24 indicated by the detection signal outputted by the crank sensor 131.

The input shaft rotation speed sensor 133 is adapted to detect the rotation speed of an input shaft 71 described below and to output a detection signal indicative of the detected rotation speed to the ECU 100 under the control of the ECU 100. The input shaft 71 is directly connected with a turbine shaft 62 of a torque converter 60 described later. The input shaft 71 has a rotation speed the same as the rotation speed of the turbine shaft 62, so that an input shaft rotation speed Nm detected by the input shaft rotation speed sensor 133 is represented as a turbine rotation speed Nt.

The output gear rotation speed sensor 134 is adapted to detect the rotation speed of an output gear 72 described later and to output a detection signal indicative of the detected rotation speed to the ECU 100 under the control of the ECU 100.

In addition, the ECU 100 is adapted to be capable of calculating a speed change ratio $\gamma$ on the basis of a transmission input shaft rotation speed Nm detected by the input shaft rotation speed sensor 133 and a transmission output rotation speed Nc detected by the output gear rotation speed sensor 134. Here, the "speed change ratio $\gamma$" is obtained by dividing the actual rotation speed Nm of the input shaft 71 by the actual rotation speed Nc of the output gear 72.

The shift sensor 141 is adapted to detect any one of switched positions among the plurality of switched positions taken by the shift lever 211 and to output a detection signal indicative of the switched position taken by the shift lever 211 to the ECU 100 under the control of the ECU 100.

Here, the shift lever 211 is constructed to take, from the rear side to the forward side of the vehicle 10, a D position indicative of a driving range (hereinafter simply referred to as a "D range"), an N position indicative of a neutral range, an R position indicative of a reverse range, and a P position indicative of a parking range.

If the shift lever 211 is located in the D range, a transmission mechanism 70 described below can establish any one of the speed stages from among the first to sixth speed stages. In this way, the ECU 100 can select any one of the speed stages from among the first to sixth speed stages on the basis of the vehicle speed V and a throttle opening degree $\theta$th as will be described hereinafter.

The accelerator sensor 142 is under the control of the ECU 100, and adapted to detect the accelerator pedal depression amount (hereinafter simply referred to as a "stroke") and to output a detection signal indicative of the detected stroke to the ECU 100 when the accelerator pedal 212 is depressed. In addition, the ECU 100 is adapted to calculate the accelerator opening degree Acc from the stroke of the accelerator pedal 212 indicated by the detection signal outputted from the accelerator sensor 142.

Therefore, the accelerator sensor 142 is adapted to detect the drive state of the vehicle 10 including the torque demand of the torque outputted from the engine 12. This means that the accelerator sensor 142 constitutes the drive state detection unit. In addition, the accelerator sensor 142 is adapted to detect the depression of the accelerator pedal 212. This means that the accelerator sensor 142 constitutes an accelerator detection unit.

The FB sensor 143 is adapted to detect whether or not the foot brake pedal 213 is depressed and to output the detection signal to the ECU 100 under the control of the ECU 100. In addition, the ECU 100 is adapted to obtain the number of times the foot brake pedal 213 has been depressed from the detected signal inputted from the FB sensor 143 while the accelerator pedal 212 is being depressed.

This means that the FB sensor 143 is adapted to detect the drive state of the vehicle 10. In other words, the FB sensor 143 constitutes the drive state detection unit. In addition, the FB sensor 143 is adapted to detect the depression of the foot brake pedal 213. In other words, the FB sensor 143 constitutes a brake detection unit. The FB sensor 143 is further adapted to detect the number of times the foot brake pedal 213 has been depressed. In other words, the FB sensor 143 constitutes the brake pedal depression number detection unit.

The throttle sensor 145 is adapted to detect the opening degree of a throttle valve of the engine 12 driven by a throttle actuator not shown and to output a detection signal indicative of the detected opening degree to the ECU 100 under the control of the ECU 100. The ECU 100 is adapted to obtain as a throttle opening degree $\theta$th the throttle valve opening degree indicated by the detection signal outputted from the throttle sensor 145.

The vehicle speed sensor 160 is adapted to detect a rotation speed of a front drive shaft 22L or a front drive shaft 22R and to output a detection signal indicative of the detected rotation speed to the ECU 100 under the control of the ECU 100. Further, the ECU 100 is adapted to obtain as a drive shaft rotation speed Nd a rotation speed of the front drive shaft 22L or the front drive shaft 22R indicated by the detection signal outputted from the vehicle speed sensor 160.

The ECU 100 further adapted to calculate the vehicle speed V on the basis of the drive shaft rotation speed Nd obtained from the vehicle speed sensor 160. The vehicle speed sensor 160 is therefore adapted to detect the drive state of the vehicle 10.

The vehicle speed sensor 160 may be adapted to detect a rotation speed of the output gear 72 in lieu of the rotation speed of the front drive shaft 22L or the front drive shaft 22R and may be adapted to calculate the vehicle speed V on the basis of the rotation speed of the output gear 72. Therefore, the vehicle sensor 160 can be substituted by the output gear rotation speed sensor 134.

The ECU 100 further adapted to calculate the acceleration $\alpha$r of the vehicle 10 from the time variation of the vehicle speed V calculated by the detection value of the vehicle speed sensor 160. The vehicle 10 can be provided with an acceleration sensor separately and can be adapted to detect the acceleration $\alpha$r by the detection value of the acceleration sensor.

The transfer input rotation speed sensor 163 is under the control of the ECU 100, and adapted to detect a rotation speed TRin of the input shaft of the transfer 16 and to output a detection signal indicative of the detected rotation speed to the ECU 100. More specifically, the ECU 100 is adapted to detect the rotation speed of an input shaft 54 of a transfer clutch 53 as will become more apparent hereinafter.

The transfer output rotation speed sensor 164 is under the control of the ECU 100, and adapted to detect a rotation speed TRout of an output shaft of the transfer 16, and to output a detection signal indicative of the detected rotation speed to the ECU 100. More specifically, the ECU 100 is adapted to detect the rotation speed of the propeller shaft 21.

The distribution SW sensor 165 is under the control of the ECU 100, and adapted to detect whether a power changing switch 215 assumes a two-wheel drive selection position or a four-wheel drive selection position, and to output a detection signal indicative of the changed position of the power changing switch 215 to the ECU 100. To select the four-wheel drive and to select a low gear for a transfer gear by the power changing switch 215 is referred to as a L4-SW selection hereinafter. The power changing switch 215 may be constructed to be able to select a distribution ratio of the driving forces of the front wheels 17L, 17R and the rear wheels 18L, 18R in lieu of the alternative selection of the two-wheel drive selection position or the four-wheel drive selection position.

The inclination detection sensor 166 is under the control of the ECU 100, and adapted to detect a tilt angle of the vehicle 10, and to output a detection signal indicative of the detected tilt angle to the ECU 100. More specifically, the inclination detection sensor 166 is provided with a weight supported swingably in all directions of the vehicle 10, and the inclination detection sensor 166 is adapted to output to the ECU 100 a signal indicative of a displacement of the weight being moved in response to the inclination in all directions of the vehicle 10.

The vehicle weight sensor 167 is under the control of the ECU 100, and adapted to detect a weight of the vehicle 10 including loading weight, and to output a detection signal indicative of the detected weight to the ECU 100. In addition, the ECU 100 is adapted to obtain as a vehicle weight the weight indicated by the detection signal outputted from the vehicle weight sensor 167.

The towing SW sensor 168 is under the control of the ECU 100, and adapted to detect whether a towing SW 216 is at a towing position indicting a vehicle towing state or at a non-towing position indicating a non-towing state, and to output to the ECU 100 a detection signal indicative of the selectively switched position of the towing SW 216. In addition, the ECU 100 is adapted to obtain as towing switch information the selectively switched position of the towing SW 216 indicated by the detection signal outputted from the towing SW sensor 168.

The atmospheric pressure sensor 169 is under the control of the ECU 100, and adapted to detect an outside atmospheric pressure of the vehicle 10, and to output a detection signal indicative of the detected outside atmospheric pressure to the ECU 100. In addition, the ECU 100 is adapted to obtain as an atmospheric pressure the outside atmospheric pressure indicated by the detection signal outputted from the atmospheric pressure sensor 169.

Next, the construction of the automatic transmission 13 in the present embodiment will be described with reference to the schematic block diagram shown in FIG. 4.

Figure 4:
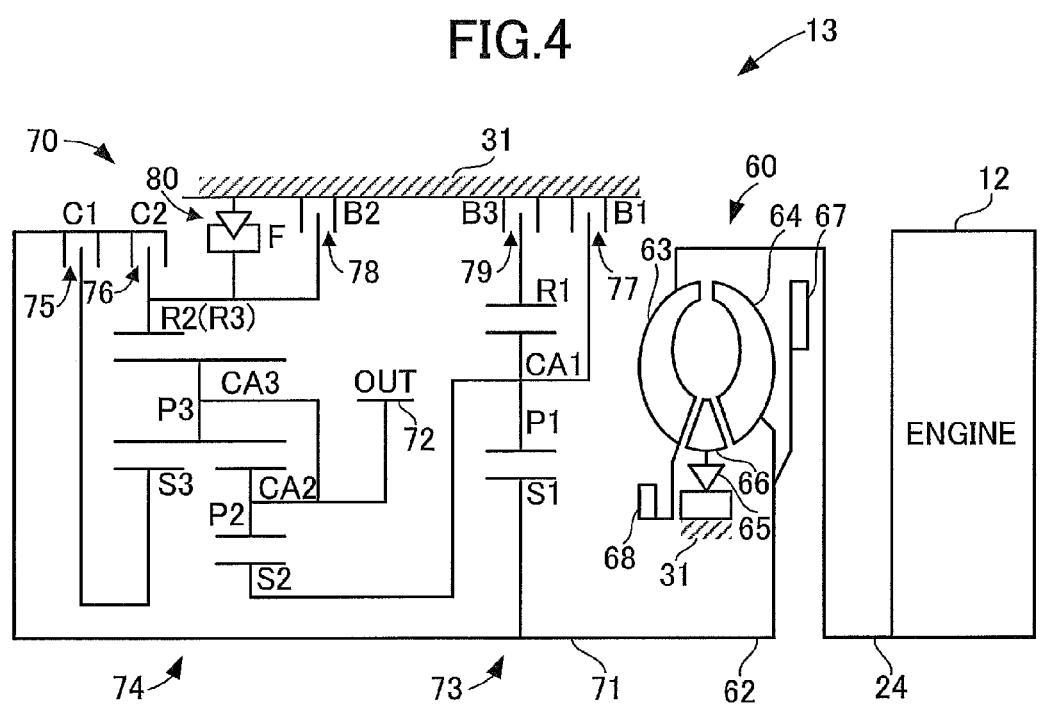
FIG. 4 is a schematic block diagram showing the construction of an automatic transmission in the embodiment of the present invention.

As shown in FIG. 4, the automatic transmission 13 comprises a torque converter 60 that transmits the torque outputted by the engine 12, and a transmission mechanism 70 that conducts the speed changes between the rotation speed of the input shaft 71 serving as an input shaft and the rotation speed of the output gear 72 serving as an output gear.

Between the transmission mechanism 70 and the front differential mechanism 14 is generally provided a reduction gear mechanism outputting the torque inputted by the transmission mechanism 70 to the front differential mechanism 14 while reducing the rotation speed and increasing the driving force. For simplifying the explanation hereinafter, the vehicle 10 in the present embodiment will be described as being designed to directly transmit the torque to the front differential mechanism 14 from the transmission mechanism 70 without providing such a reduction gear mechanism.

The torque converter 60 is arranged between the engine 12 and the transmission mechanism 70, and comprises a pump impeller 63 inputted with the torque from the engine 12, a turbine runner 64 outputting the torque to the transmission mechanism 70, a stator 66 that changes the flow direction of oil, and a lock-up clutch 67 that directly connects the pump impeller 63 with the turbine runner 64, so that the torque can be transmitted through the oil.

The pump impeller 63 is connected to the crank shaft 24 of the engine 12. The pump impeller 63 is designed to be rotated integrally with the crank shaft 24 by the torque of the engine 12.

The turbine runner 64 is connected to the turbine shaft 62 which is in turn connected to the transmission mechanism 70. The turbine shaft 62 is directly connected to the input shaft 71 of the transmission mechanism 70. The turbine runner 64 is rotated by the flow of the oil pushed by the rotation of the pump impeller 63, and designed to output to the transmission mechanism 70 the rotation of the crank shaft 24 of the engine 12 through the turbine shaft 62.

The stator 66 is rotatably supported through a one-way clutch 65 by a housing 31 of the automatic transmission 13 constituting a non-rotating member. The stator 66 serves to change the directions of the oil flow from the turbine runner 64 to the pump impeller 63 to generate a force to turn the pump impeller 63. The stator 66 is prevented from rotating by the one-way clutch 65 to change the direction of the oil flowing in the stator 66.

The stator 66 idles away to prevent a reverse torque from being applied to the turbine runner 64 when the pump impeller 63 and the turbine runner 64 come to be rotated at almost the same rotation speed.

The lock-up clutch 67 is constructed to directly connect the pump impeller 63 with the turbine runner 64 to have the rotation of the crank shaft 24 of engine 12 mechanically transmitted directly to the turbine shaft 62.

Here, the torque converter 60 is adapted to transmit the torque through the oil between the pump impeller 63 and the turbine runner 64. Therefore, the pump impeller 63 cannot transmit all amount of torque to the turbine runner 64. For this reason, when the speeds of the turbine shaft 62 and the crank shaft 24 become close to each other, the lock-up clutch 67 is operated to mechanically connect the pump impeller 63 with the turbine runner 64 directly, more particularly, to mechanically directly connect the crank shaft 24 with the turbine shaft 62 for improving the transmission efficiency to the transmission mechanism 70 from the engine 12, thereby resulting in improving the fuel efficiency.

The lock-up clutch 67 is constructed to be able to realize a flex lock-up causing a slip at a predetermined slip ratio. The state of the lock-up clutch 67 is adapted to be selected by the CPU of the ECU 100 in response to the travel state of the vehicle 10, more specifically, the vehicle speed V and the accelerator opening degree Acc based on the lock-up control map stored in the ROM of the ECU 100. In addition, the state of the lock-up clutch 67 can, as described above, assume one of three states, viz., a converter state having the lock-up clutch 67 released, a lock-up state having the lock-up clutch 67 coupled, and a flex lock-up state having the lock-up clutch 67 slipped.

In addition, the pump impeller 63 is provided with a mechanical type of oil pump 68 that generates hydraulic pressure used for performing the transmission action of the transmission mechanism 70, and for supplying the oil to activate, lubricate and cool parts and elements.

The transmission mechanism 70 comprises, in addition to the input shaft 71 and the output gear 72, a first planetary gear 73, a second planetary gear 74, a C1 clutch 75, a C2 clutch 76, a B1 brake 77, a B2 brake 78, a B3 brake 79, and an F one-way clutch 80.

The input shaft 71 is directly connected to the turbine shaft 62 of the torque converter 60 so that the input shaft 71 can be directly inputted with the outputted rotation of the torque converter 60. The output gear 72 is connected with a carrier of the second planetary gear 74 and is held in engagement with a differential ring gear 42 of the front differential mechanism 14 as will be described hereinafter, so that the output gear 72 can function as a counter drive gear. This means that the output gear 72 is adapted to transmit the outputted rotation of the transmission mechanism 70 to the front differential mechanism 14.

The first planetary gear 73 is constituted by a single pinion type of planetary gear mechanism. The first planetary gear 73 comprises a sun gear S1, a ring gear R1, a pinion gear P1, and a carrier CA1.

The sun gear S1 is coupled to the input shaft 71. The sun gear S1 is connected to the turbine shaft 62 of the torque converter 60 through the input shaft 71. The ring gear R1 is selectively fixed to the housing 31 of the automatic transmission 13 through the B3 brake 79.

The pinion gear P1 is rotatably supported by the carrier CA1. The pinion gear P1 is held in mesh with the sun gear S1 and the ring gear R1. The carrier CA1 is selectively fixed to the housing 31 of the automatic transmission 13 through the B1 brake 77.

The second planetary gear 74 is constituted by a ravigneaux type of planetary gear mechanism. The second planetary gear 74 comprises a sun gear S2, ring gears R2, R3, a short pinion gear P2, a long pinion gear P3, a sun gear S3, a carrier CA2, and a carrier CA3.

The sun gear S2 is connected with the carrier CA1 of the first planetary gear 73. The ring gears R2, R3 are selectively connected to the input shaft 71 through the C2 clutch 76. The ring gears R2, R3 are selectively fixed to the housing 31 through the B2 brake 78. The ring gears R2, R3 are blocked in rotation in a rotation direction opposite to the rotation direction of the input shaft 71 (hereinafter simply referred to as an "opposite direction") by the F one-way clutch 80 provided in parallel with the B2 brake 78.

The short pinion gear P2 is rotatably supported by the carrier CA2. The short pinion gear P2 is held in mesh with the sun gear S2 and the long pinion gear P3. The long pinion gear P3 is rotatably supported by the carrier CA3. The long pinion gear P3 is held in mesh with the short pinion gear P2, the sun gear S3, and the ring gears R2, R3.

The sun gear S3 is selectively connected with the input shaft 71 through the C1 clutch 75. The carrier CA2 is connected with the output gear 72. The carrier CA3 is connected to the carrier CA2 and the output gear 72.

In addition, the B1 brake 77, the B2 brake 78, and the B3 brake 79 are fixed to the housing 31 of the automatic transmission housing 13. The C1 clutch 75, the C2 clutch 76, the F one-way clutch 80, the B1 brake 77, the B2 brake 78, and the B3 brake 79 (hereinafter simply referred to as a "clutch C" and "brake B", respectively, as long as the above clutches and the above brakes are particularly not needed to be distinguished) are each constituted by a hydraulic type of friction engagement device having a multi-plate type of clutch or brake hydraulically activated and controlled by a hydraulic actuator. The clutch C and the brake B are changeable to assume the engagement state from the disengagement state, and vice versa, according to the hydraulic circuit to be changed by the energization or de-energization of the linear solenoid valves SL1 to SL5, SLU, SLT, and the on-off solenoid valve SL of the hydraulic control device 110 and to be changed by the operation state of the manual valve not shown.

Next, the transmission mechanism 70 of the automatic transmission 13 in the present embodiment will be explained hereinafter with reference to the operation table shown in FIG. 5 while focusing on the engagement state of the frictional engagement elements to realize each of the transmission stages.

As shown in FIG. 5, the operation table to be used for realizing each of the transmission stages shows the engagement and disengagement states to be assumed by each of the frictional engagement elements of the transmission mechanism 70, viz., the clutches C and the brakes B to realize each of the transmission stages. In FIG. 5, the mark "○" (circle) is representative of the engagement, and the mark "X" (cross) is representative of the disengagement. The mark "⊚" (double circle) is representative of the engagement only at the time of applying an engine brake, and the mark "Δ" (triangle) is representative of the engagement only at the time of driving the vehicle 10.

On the basis of the combination of the engagement and disengagement shown in the operation table, each of the frictional engagement elements are operated by the energization and de-energization or the electric current control of the linear solenoid valves SL1 to SL5 provided in the hydraulic control device 110 (see FIG. 1) and the transmission solenoids not shown to establish the first to sixth stages of the forward speed change stages and the rearward speed change stage.

On the basis of the operation table, the ECU 100 is operated to engage the F one-way clutch 80 in addition to the engagement of the C1 clutch 75 at the time of driving the vehicle 10, for example, in the case of realizing the first speed state. Further, the ECU 100 is operated to engage the B2 brake 78 in addition to the C1 clutch 75 at the time of applying the engine brake in the case of realizing the first speed state.

For realizing the rearward speed change stage, the ECU 100 is operated to engage the B2 brake 78 and the B3 brake 79. Further, for realizing the neutral range and the parking range, the ECU 100 is operated to disengage all of the C1 clutch 75, the C2 clutch 76, the B1 brake 77, the B2 brake 78, the B3 brake 79, and the F one-way clutch 80. In this way, all of the disengagements of the frictional engagement elements of the transmission mechanism 70 cause the neutral state with no torque transmission between the input side and the output side to be established.

Next, the function about each of the solenoid valves of the hydraulic control device 110 will be explained hereinafter. The linear solenoid valve SLT is adapted to perform the hydraulic control of the line pressure PL serving as a source hydraulic pressure of the oil to be supplied to the parts and the elements. More specifically, the linear solenoid valve SLT is controlled by the ECU 100 to adjust the line pressure PL on the basis of the throttle opening degree θth, the amount of intake air Qar of the engine 12, a temperature Tw of the cooling water of the engine 12, the rotation speed Ne of the engine 12, the rotation speed Nm of the input shaft, viz., the rotation speed Nt of the turbine, a temperature Tf of the oil in the automatic transmission 13 and the hydraulic control device 110, shift positions Psh, shift ranges, and other factors.

The linear solenoid valve SLU is adapted to perform the lock-up control of the torque converter 60. More specifically, the linear solenoid valve SLU is controlled by the ECU 100 on the basis of the engine rotation speed Ne indicative of the input rotation speed of the torque converter 60, the turbine rotation speed Nt indicative of the output rotation speed of the torque converter 60, the throttle opening degree θth, the vehicle speed V, the input torque, and other factors to adjust the pressure of a lock-up relay valve and a lock-up control valve not shown in the drawings to control the lock-up clutch 67. The on-off solenoid valve SL is adapted to perform the changing operation of the hydraulic pressure of the lock-up relay valve.

The linear solenoid valves SL1 to SL5 serve to perform the speed change control. The linear solenoid valves SL1 and SL2 function to hydraulically control the C1 clutch 75 and the C2 clutch 76. The linear solenoid valves SL3, SL4 and SL5 are designed to hydraulically control the B1 brake 77, the B2 brake 78, and the B3 brake 79.

The constructions of the front differential mechanism 14 and the transfer 16 in the present embodiment will be explained hereinafter with reference to the schematic block diagram shown in FIG. 6.

Figure 6:
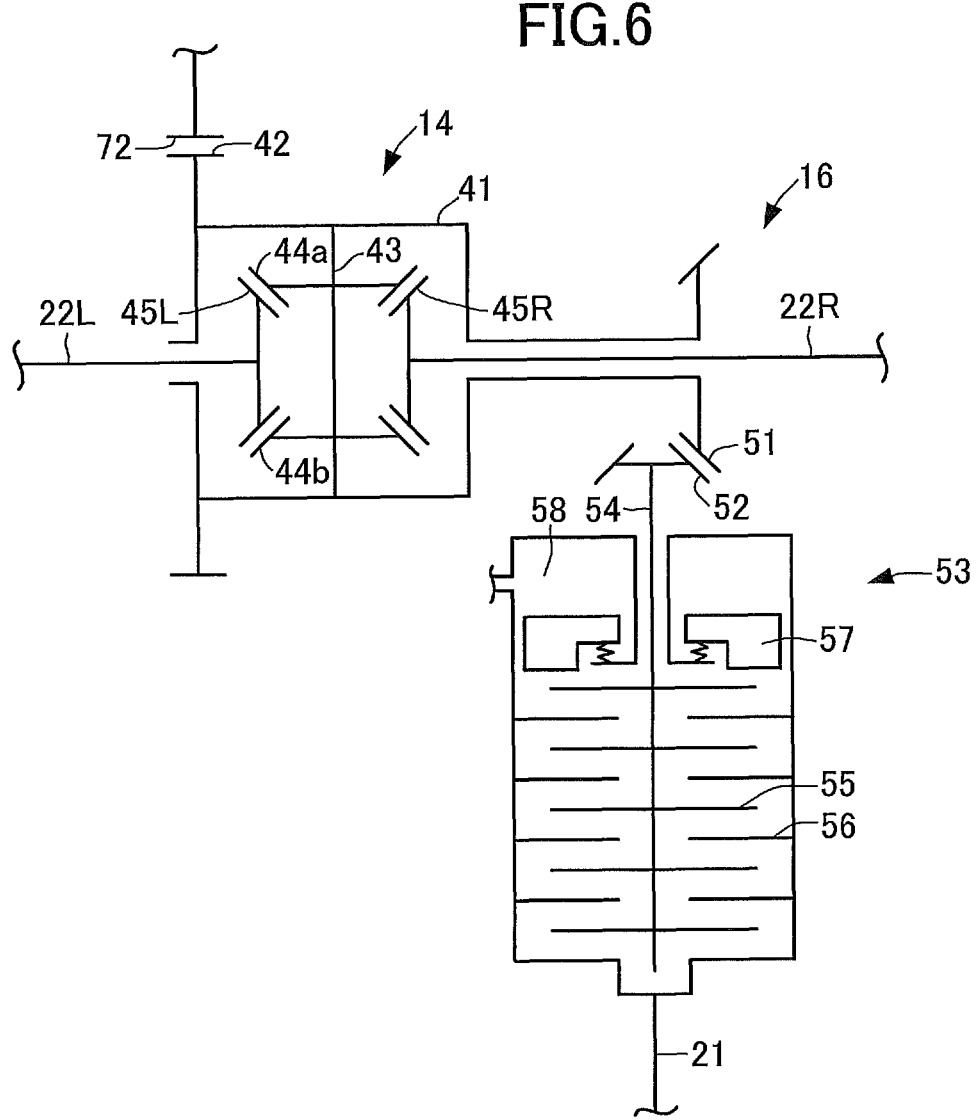
FIG. 6 is a schematic block diagram showing the constructions of a front differential mechanism and a transfer in the embodiment of the present invention.

As shown in FIG. 6, the front differential mechanism 14 comprises a hollow differential gear case 41, a differential ring gear 42 provided on the outer peripheral portion of the differential gear case 41, a pinion shaft 43 provided in the differential gear case 41, differential pinion gears 44a, 44b, and side gears 45L, 45R. Further, the differential pinion gears 44a, 44b, and the side gears 45L, 45R are each constituted by a bevel gear.

The differential gear case 41 is rotatably supported on and around the front drive shafts 22L, 22R. The differential ring gear 42 is provided on the outer peripheral portion of the differential gear case 41, and is in engagement with the output gear 72 of the automatic transmission 13. The pinion shaft 43 is in parallel with the differential ring gear 42 and secured to the differential gear case 41, so that the pinion shaft 43 is rotated integrally with the differential gear case 41.

The differential pinion gears 44a, 44b are rotatably supported on and around the pinion shaft 43. The side gear 45L is securely mounted so as to be rotated integrally with the front drive shaft 22L, and is held in meshing engagement with the differential pinion gear 44a and the differential pinion gear 44b. In a similar manner, the side gear 45R is securely mounted so as to be rotated integrally with the front drive shaft 22R, and is held in meshing engagement with the differential pinion gear 44a and the differential pinion gear 44b.

It is thus to be noted that the front differential mechanism 14 is constructed to have the side gear 45L and the side gear 44R rotated together when the differential pinion gear 44a and the differential pinion gear 44b are not rotated. On the other hand, the front differential mechanism 14 is constructed to have the side gear 45L and the side gear 44R relatively rotated in their opposite directions when the differential pinion gears 44a, 44b are rotated. It is therefore understood that the front differential mechanism 14 is constructed to allow the rotation speed difference between the side gear 45L integrally rotated with the front drive shaft 22L and the side gear 45R integrally rotated with the front drive shaft 22R, thereby making it possible to absorb the rotation speed difference between the front wheel 17L and the front wheel 17R when the vehicle is travelling on a curved road.

The rear differential mechanism 15 is the same in construction as the front differential mechanism 14, and thus will not be explained in detail hereinafter. The rear differential mechanism 15 has the differential ring gear 42 held in engagement with the pinion gear of the propeller shaft 21 in place of the output gear 72 of the automatic transmission 13. The rear differential mechanism 15 has the left and right side gears rotated integrally with the rear drive shafts 23L, 23R in lieu of the front drive shafts 22L, 22R.

The transfer 16 comprises a hypoid gear 51, a hypoid pinion 52, and a transfer clutch 53.

The hypoid gear 51 is integrally rotated with the differential gear case 41 of the front differential mechanism 14 to input the torque to the transfer 16 from the automatic transmission 13 through the front differential mechanism 14. The hypoid pinion 52 and the hypoid gear 51 are each constituted by a gear such as for example a bevel gear to convert by 90 degrees the rotation direction of the torque inputted from the hypoid gear 51.

The transfer clutch 53 comprises an input shaft 54, a plurality of multi-plate clutch discs 55, a plurality of multi-plate clutch plates 56, and a piston 57, and has a hydraulic servo chamber 58 formed therein. The transfer clutch 53 is constructed to have the hypoid pinion 52 and the propeller shaft 21 connected with each other to make it possible for the torque to be transmitted. The transfer clutch 53 itself is constructed by a known wet multi-plate clutch of a hydraulic servo type.

The input shaft 54 is connected with the hypoid pinion 52 to be inputted with the torque from the hypoid pinion 52 and to output the torque to the multi-plate clutch discs 55. The multi-plate clutch plates 56 are constructed to transmit the torque to the propeller shaft 21. The multi-clutch discs 55 and the multi-plate clutch plates 56 collectively constitute a multi-plate clutch as defined in the present invention.

The hydraulic pressure in the hydraulic servo chamber 58 is controlled by the hydraulic control device, so that the hydraulic pressure fed into the hydraulic servo chamber 58 causes the multi-plate clutch discs 55 and the multi-plate clutch plates 56 to be pressed by the piston 57 at a predetermined pressure, thereby securing a predetermined amount of torque transmission therebetween.

The transfer 16 is constructed to distribute the driving force of the engine 12 to the front wheels 17L, 17R and the rear wheels 18L, 18R as understood from the previous description. This means that the transfer 16 constitutes a driving force distribution device.

The characteristic construction of the ECU 100 mounted on the vehicle 10 in the embodiment according to the present invention will be explained hereinafter.

The ECU 100 is adapted to execute the reduction control to reduce the torque outputted from the engine 12 for the amount of the torque demand. In addition, the ECU 100 is adapted to execute the reduction control when three conditions are simultaneously established, viz., the depression of the accelerator pedal 212 is detected by the accelerator sensor 142, the depression of the foot brake pedal 213 is detected by the FB sensor 143, and the ECU 100 determines that the driver has a braking intention by comparing with the deceleration threshold value the travel state calculated on the basis of the drive state detected by each sensor 131 to 221. On the other hand, the ECU 100 is adapted not to execute the reduction control when the depression of the accelerator pedal 212 is not detected by the accelerator sensor 142, or when the depression of the foot brake pedal 213 is not detected by the FB sensor 143, or when the ECU 100 determines that the driver has no braking intention.

The ECU 100 is adapted to determine the driver's braking intention by comparing the acceleration $\alpha r$ calculated on the basis of the drive state detected by each sensor 131 to 221 with the deceleration threshold value of the acceleration $\alpha r$. The ECU 100 is further adapted to determine the driver's braking intention by comparing the vehicle speed V calculated on the basis of the drive state detected by each sensor 131 to 221 with the deceleration threshold value of the vehicle speed V. This means that the ECU 100 constitutes the output control unit.

Further, the ECU 100 is adapted to set the deceleration threshold value determining the driver's braking intention on the basis of the correlation between the depression amount of the accelerator pedal 212 and the depression amount of the foot brake pedal 213, and a travel state of the vehicle 10 caused by the depression amount of the accelerator pedal 212 and the depression amount of the foot brake pedal 213. In addition, the ECU 100 is adapted to change the deceleration threshold value on the basis of the drive state detected by each sensor 131 to 221.

The ECU 100 is adapted to set the deceleration threshold value of the acceleration αr as the acceleration αr of the vehicle 10 being indicative of the travel state of the vehicle 10, and to change the deceleration threshold value of the acceleration αr on the basis of the detected drive state. The ECU 100 is further adapted to set the deceleration threshold value of the vehicle speed V as the vehicle speed V of the vehicle 10 being indicative of the travel state of the vehicle 10, and to change the deceleration threshold value of the vehicle speed V on the basis of the detected drive state.

The ECU 100 is adapted to change the deceleration threshold value on the basis of a pressure detected by the negative pressure sensor 221. The ECU 100 is further adapted to change the deceleration threshold value based on the number of the depressions of the foot brake pedal 213 detected by the FB sensor 143.

The ECU 100 is adapted to change the deceleration threshold value on the basis of an inclination state detected by the inclination detection sensor 166. The ECU 100 is further adapted to change the deceleration threshold value based on a gradient state of the vehicle position obtained from the navigation system 170.

The ECU 100 is adapted to change the deceleration threshold value on the basis of a vehicle weight detected by the vehicle weight sensor 167. The ECU 100 is further adapted to change the deceleration threshold value based on towing information detected by the towing SW sensor 168.

The ECU 100 is adapted to change the deceleration threshold value on the basis of an atmospheric pressure detected by the atmospheric pressure sensor 169. The ECU 100 is further adapted to change the deceleration threshold value based on an elevation of the vehicle position obtained from the navigation system 170. This means that the ECU 100 constitutes the threshold value setting unit.

Next, the operation of the vehicle control process in the present embodiment will be described with reference to a flowchart shown in FIG. 7.

The flowchart shown in FIG. 7 represents an executing content of a program for vehicle control process to be executed by the CPU of the ECU 100 with the RAM as a work area. The program for the vehicle control process is stored in the ROM of the ECU 100. The vehicle control process is designed to be executed by the CPU of the ECU 100 at a predetermined interval.

As shown in FIG. 7, the ECU 100 is operated to determine whether or not the L4-SW is unselected (Step S11).

The ECU 100 is adapted to finish the vehicle control process when the ECU 100 determines that the L4-SW is not unselected, viz., the L4-SW is selected ("NO" in Step S11), because the reduced torque of the engine 12 causes hesitation and the like, and leads to the drivability deterioration.

When, on the other hand, the ECU 100 determines that the L4-SW is unselected ("YES" in Step S11), the ECU 100 then determines whether or not both of the accelerator and the brake are "on" and finishes the vehicle control process if the accelerator or the brake is not "on" (Step S12). More specifically, the ECU 100 is adapted to determine whether or not the accelerator opening degree Acc detected by the accelerator sensor 142 is equal to or more than the accelerator pedal depression determination value Acc_tv stored in the ROM. When the ECU 100 determines that the accelerator opening degree Acc is equal to or larger than the accelerator pedal depression determination value Acc_tv, the ECU 100 is adapted to determine that the accelerator pedal 212 is depressed, viz., the accelerator is "on". When, on the other hand, the ECU 100 determines that the accelerator opening degree Acc is less than the accelerator pedal depression determination value Acc_tv, the ECU 100 is adapted to determine that the accelerator pedal 212 is not depressed, viz., the accelerator is "off". In addition, the ECU 100 is adapted to determine whether the brake pedal 213 is depressed, viz., the brake is "on" or the brake pedal 213 is not depressed, viz., the brake is "off" by a detection signal detected by the FB sensor 143.

If the accelerator is "on" and the brake is "on" ("YES" in Step S12) when the ECU 100 determines whether or not both of the accelerator and the brake are "on" (Step S12), the ECU 100 starts a timer and monitors the duration of the accelerator and the brake being depressed together. Then, if the accelerator is "off" or the brake is "off" ("NO" in Step S12), the ECU 100 clears the timer of the duration of the accelerator and the brake being depressed together and finishes the monitoring.

If the accelerator is "on" and the brake is "on" ("YES" in Step S12), the ECU 100 is adapted to determine whether or not the state of the accelerator pedal and the brake pedal being depressed together continues for less than a certain period. When the ECU 100 determines that the state of the accelerator pedal and the brake pedal being depressed together continues for not less than the certain period, viz., the state of the accelerator pedal and the brake pedal being depressed together continues for equal to or longer than the certain period, the ECU 100 is adapted to finish the vehicle control process (Step S13).

On the other hand, when the ECU 100 determines that the state of the accelerator pedal and the brake pedal being depressed together continues for less than the certain period ("YES" in Step S13), the ECU 100 is adapted to determine whether or not a correlation between the operation amount of the driver and the travel state of the vehicle 10 is deviated (Step S14). The more specific explanation of the correlation between the operation amount and the travel state, and a deviation of the correlation will become apparent as the description proceeds hereinafter.

When the ECU 100 determines that the correlation between the operation amount and the travel state is deviated ("YES" in Step S14), the ECU 100 is adapted to set the deceleration threshold value converted in response to the drive state (Step S15). When, on the other hand, the ECU 100 determines that the correlation between the operation amount and the travel state is not deviated ("NO" in Step S14), the ECU 100 is adapted to set a normal deceleration threshold value (Step S16).

More specifically, the ECU 100 determines a deceleration threshold value in response to the detected values of the accelerator opening degree Acc and the vehicle speed V on the basis of the deceleration threshold value map. When the ECU 100 determines that the correlation between the operation amount and the travel state is deviated, the ECU 100 is adapted to convert the deceleration threshold value in response to the drive state. For example, the ECU 100 is adapted to convert the deceleration threshold value in response to a value of the pressure detected by the negative pressure sensor 221.

Next, the ECU 100 is adapted to perform the deceleration determination, and to finish the vehicle control process if the deceleration determination is not "on", viz., the deceleration determination is "off" (Step S17). In the deceleration determination process, the ECU 100 is adapted to convert the deceleration threshold value in response to the drive state, thereby performing the determination to reflect the driver's intention.

The ECU 100 is adapted to execute an engine output suppression process (Step S18), when the deceleration determination is "on" ("YES" in Step S17). For example, the ECU 100 is adapted to rewrite the accelerator opening degree value from an actual accelerator opening degree Acc to the output reducing accelerator opening degree Acn stored in the ROM to reduce the torque of the engine 12, so that the torque can be reduced lower than the engine output according to the actual accelerator opening degree Acc. Here, a reduction speed of an engine torque, i.e., a rate of the change from the actual accelerator opening degree Acc to the output reducing accelerator opening degree Acn can make a time to be reduced to a desired engine torque become a constant time by adjusting the rate of the change in response to the vehicle speed V.

Next, the ECU 100 is adapted to determine whether or not a termination condition of the engine output suppression process is established (Step S19). More specifically, the ECU 100 is adapted to determine whether or not the brake is "off" or a state of a hysteresis width of the accelerator opening degree exceeding a predetermined hysteresis width continues for a predetermined period. When the ECU 100 determines that the brake is "on" and the hysteresis width of the accelerator opening degree is equal to or less than the predetermined hysteresis width, or a predetermined period has not elapsed even if the hysteresis width of the accelerator opening exceeds the predetermined hysteresis width, the ECU 100 is adapted to return to the engine output suppression process (Step S18). Here, the hysteresis width of the accelerator opening degree is intended to mean the difference between the actual accelerator opening degree Acc before the engine output suppression process (Step S18) and the current actual accelerator opening degree Acc detected by the accelerator sensor 142.

When the termination condition of the engine output suppression process is established, viz., the ECU 100 is adapted to determine that the brake is "off", or the state of the hysteresis width of the accelerator opening degree exceeding the predetermined hysteresis width continues for a given period ("YES" in Step S19), the ECU 100 is adapted to perform the torque returning process of the engine 12, and to finish the vehicle control process (Step S20). For example, if the ECU 100 has rewritten the accelerator opening degree in the engine output suppression process (Step S18), the ECU 100 is adapted to return the accelerator opening degree to the actual accelerator opening degree Acc detected by the accelerator sensor 142, and to return the torque of the engine 12 to the torque at the time of normal travel state.

Next, the correlation between the operation amount of the driver and the travel state of the vehicle 10, and the deviation of the correlation will be described hereinafter.

The vehicle 10 is operated to take a travel state in response to the operation amount of the driver if the condition is the same. For example, the vehicle 10 is operated to generate the driving force and the braking force in response to an accelerator opening degree θth and a brake depression force Bf respectively, to determine the vehicle speed V and the acceleration αr. The accelerator opening degree θth is determined by the depression amount of the accelerator pedal 212 by the driver, and the brake depression force Bf is determined by the depression amount of the foot brake pedal 213 by the driver. Therefore, there is a correlation between the operation amount of the driver and the travel state of the vehicle 10.

However, the vehicle 10 is supposed to take different travel states due to the differences of the negative pressures in the brake booster 26, the gradients of the travel roads, loading weights, and the atmospheric pressures during travelling, even if the operation amount of the driver is the same. This means that the correlation between the operation amount of the driver and the travel state of the vehicle 10 is deviated from the original correlation by the above conditions.

The explanation in detail will be made hereinafter. The acceleration αr will be explained as an example of the travel state of the vehicle 10 in the following explanation. First, the fact that the travel state is different due to the difference of the negative pressure in the brake booster 26 will be explained.

The vehicle 10 is operated to open the throttle to take an outside air into suction pipe of the engine 12 when the accelerator pedal 212 is depressed. For this reason, the brake booster 26 is operative to close the passages between the pedal side chamber and the suction pipe and between the cylinder side chamber and the suction pipe not to release the negative pressure when the accelerator pedal 212 is depressed. When the brake pedal 213 is depressed several times in this state, the difference between the atmospheric pressure and the negative pressure is large at the first depression, however, the fact that the negative pressure is diluted with the introduced atmospheric pressure results in that the difference between the atmospheric pressure and the negative pressure becomes small at the second and subsequent times. In other words, the pressure difference between the pedal side chamber and the cylinder side chamber becomes small.

Therefore, when the accelerator pedal 212 and the foot brake pedal 213 are simultaneously depressed, the movement amount of the booster piston is varied depending on the negative pressure in the cylinder side chamber of the brake booster 26, and thus the hydraulic pressure generated by the brake master cylinder is changed. Because of the changed hydraulic pressure generated by the brake master cylinder, the braking force by the brake body is changed and the acceleration αr is also changed.

This results in the fact that the correlation between the operation amount of the driver and the travel state of the vehicle 10 becomes different depending on the negative pressure in the brake booster 26.

Therefore, the ECU 100 is adapted to determine the correlation between the operation amount and the travel state is deviated when the pressure in the cylinder side chamber of the brake booster 26 detected by the negative pressure sensor 221 becomes higher than the predetermined intake air pressure threshold value. The ECU 100 is further adapted to convert the deceleration threshold value to the deceleration threshold value in response to the pressure in the cylinder side chamber of the brake booster 26 when the above correlation is deviated.

The ECU 100 is adapted to determine that the correlation between the operation amount and the travel state is deviated when the number of the depressions of the foot brake pedal 213 detected by the FB sensor 143 becomes equal to or larger than the predetermined number of the depressions while the depression of the accelerator pedal 212 continues. The ECU 100 is further adapted to convert the deceleration threshold value to the deceleration threshold value in response to the number of the depressions of the foot brake pedal 213 when the above correlation is deviated.

Next, the fact that the travel state is different due to the difference of the gradient of the travel road during travelling will be explained.

The vehicle 10 receives the backward acceleration by the gravity when travelling on the uphill. On the other hand, the vehicle 10 receives the forward acceleration by the gravity when travelling on the downhill. Therefore, the vehicle 10 has the different acceleration αr depending on the gradient of the travel road during travelling even if the depression amounts of the accelerator pedal 212 and the foot brake pedal 213 are the same.

This results in the fact that the correlation between the operation amount of the driver and the travel state of the vehicle 10 is different depending on the gradient of the travel road during travelling.

Therefore, the ECU 100 is adapted to determine that the correlation between the operation amount and the travel state is deviated when an inclination angle detected by the inclination detection sensor 166 becomes larger than the predetermined inclination angle. The ECU 100 is further adapted to convert the deceleration threshold value to the deceleration threshold value in response to the inclination angle detected by the inclination detection sensor 166 when the above correlation is deviated.

The ECU 100 is adapted to obtain a gradient of the current position of the vehicle 10 determined by the current position information and the map information of the vehicle 10 from the navigation system 170, and to determine that the correlation between the operation amount and the travel state is deviated when the gradient becomes larger than the predetermined gradient. The ECU 100 is further adapted to convert the deceleration threshold value to the deceleration threshold value in response to the gradient of the current position of the vehicle 10 when the above correlation is deviated.

Next, the fact that the travel state is different depending on the difference of the weight of the vehicle 10 will be explained. The vehicle 10 is supposed to be difficult to increase or decrease the vehicle speed V in response to the heavier weight by the law of inertia. In other words, the vehicle 10 is difficult to change the acceleration αr in response to the heavier weight. Therefore, the vehicle 10 has the different acceleration αr depending on the loading weight and the presence or the absence of towing even if the depression amounts of the accelerator pedal 212 and the foot brake pedal 213 are the same.

This results in the fact that the correlation between the operation amount of the driver and the travel state of the vehicle 10 is different depending on the number of passengers and the loading weight. In addition, the ECU 100 is adapted to control the torque of the engine 12 when towing information is inputted therein by the towing SW 216, thereby resulting in that the above correlation is different depending on the towing information.

Therefore, the ECU 100 is adapted to determine that the correlation between the operation amount and the travel state is deviated when a vehicle weight detected by the vehicle weight sensor 167 becomes heavier than the predetermined vehicle weight. The ECU 100 is further adapted to convert the deceleration threshold value to the deceleration threshold value in response to the vehicle weight detected by the vehicle weight sensor 167 when the above correlation is deviated.

The ECU 100 is adapted to determine that the correlation between the operation amount and the travel state is deviated when towing SW information detected by the towing SW sensor 168 is the information indicating the towing position. The ECU 100 is further adapted to convert the deceleration threshold value to the predetermined deceleration threshold value at the time of the towing when the above correlation is deviated.

Next, the fact that the travel state is different depending on the difference of the atmospheric pressure will be explained. The vehicle 10 is supposed to decrease the oxygen amount sucked into the engine 12 because the oxygen concentration is low, when the atmospheric pressure is low at highlands and by other reasons. If the amount of oxygen sucked into the engine 12 is decreased, the vehicle 10 is supposed not to adequately perform the fuel combustion, thereby resulting in that the torque is decreased. In addition, there is a possibility that the acceleration αr is affected by the atmospheric pressure if the vehicle 10 is very light, because a travel resistance is different depending on the difference of the atmospheric pressure. Therefore, the vehicle 10 has the different acceleration αr depending on the atmospheric pressure even if the depression amounts of the accelerator pedal 212 and the foot brake pedal 213 are the same.

This results in the fact that the correlation between the operation amount of the driver and the travel state of the vehicle 10 is different depending on the atmospheric pressure.

The ECU 100 is adapted to determine that the correlation between the operation amount and the travel state is deviated when the atmospheric pressure detected by the atmospheric pressure sensor 169 is lower than the predetermined atmospheric pressure. The ECU 100 is further adapted to convert the deceleration threshold value to the deceleration threshold value in response to the atmospheric pressure detected by the atmospheric pressure sensor 169.

The ECU 100 is adapted to obtain an elevation of the current position of the vehicle 10 determined by the current position information and the map information of the vehicle 10 from the navigation system 170, and to determine that the correlation between the operation amount and the travel state is deviated when the elevation becomes higher than the predetermined elevation. The ECU 100 is further adapted to convert the deceleration threshold value to the deceleration threshold value in response to the elevation of the current position of the vehicle 10 when the above correlation is deviated.

As will be understood from the foregoing description, the vehicle control apparatus according to the present embodiment is adapted to set the deceleration threshold value determining the driver's braking intention on the basis of the correlation of the depression amount of the accelerator pedal 212 and the depression amount of the foot brake pedal 213, and a travel state of the vehicle 10 caused by the depression amount of the accelerator pedal 212 and the depression amount of the foot brake pedal 213. The vehicle control apparatus according to the present embodiment is further adapted to change the deceleration threshold value based on the detected drive state, and to determine the braking intention by comparing with the converted deceleration value the travel state calculated based on the detected drive state. This makes it possible to estimate the driver's braking intention based on the travel state calculated from the drive state of the vehicle without detecting the operation amount of the driver, as well as to determine the driver's braking intention based on the travel state varied in response to the factors other than the operation amount of the driver, so that the driver's intention can accurately be estimated to have the reduction control changed selectively to be executed or not to be executed, thereby making it possible to improve the drivability.

For example, the vehicle control apparatus according to the present embodiment is adapted to set the deceleration threshold value of the acceleration αr as the travel state of the above vehicle 10, and to change the deceleration threshold value of the acceleration αr based on the drive state. The vehicle control apparatus according to the present embodiment is further adapted to determine the driver's braking intention by comparing the acceleration αr calculated based on the detected drive state with the deceleration threshold value of the acceleration αr, thereby making it possible to improve the drivability. Moreover, the vehicle control apparatus according to the present embodiment is also adapted to set the deceleration threshold value of the vehicle speed V as the travel state of the above vehicle 10, thereby making it possible to improve the drivability as well as the above example.

The vehicle control apparatus according to the present embodiment is further adapted to change the deceleration threshold value based on the negative pressure in the cylinder side chamber of the brake booster 26. This makes it possible to accurately estimate the driver's intention to have the reduction control changed selectively to be executed or not to be executed, thereby making it possible to improve the drivability, even if the negative pressure of the brake booster 26 is released by the foot brake pedal 213 being depressed while the accelerator pedal 212 is being depressed.

The vehicle control apparatus according to the present embodiment is further adapted to change the deceleration threshold value based on the number of the depression of the foot brake pedal 213. This makes it possible to accurately estimate the driver's intention to have the reduction control changed selectively to be executed or not to be executed, thereby making it possible to improve the drivability, even if the negative pressure of the brake booster 26 is released by the foot brake pedal 213 being depressed several times while the accelerator pedal 212 is being depressed.

The vehicle control apparatus according to the present embodiment is further adapted to change the deceleration threshold value based on the inclination of the vehicle 10. This makes it possible to estimate the gradient of the vehicle position although the acceleration αr of the vehicle 10 is different depending on the gradient of the vehicle position, and to accurately estimate the driver's intention to have the reduction control changed selectively to be executed or not to be executed, thereby making it possible to improve the drivability, even if the depression amount of the acceleration pedal 212 and the depression amount of the foot brake pedal 213 are the same.

The vehicle control apparatus according to the present embodiment is further adapted to detect the gradient of the vehicle position based on the position information of the vehicle 10 and the map information preliminarily memorized, and to change the deceleration threshold value based on the gradient state of the detected vehicle position. This makes it possible to accurately estimate the driver's intention to have the reduction control changed selectively to be executed or not to be executed, thereby making it possible to improve the drivability.

The vehicle control apparatus according to the present embodiment is further adapted to change the deceleration threshold value based on the vehicle weight, thereby making it possible to accurately estimate the driver's intention to have the reduction control changed selectively to be executed or not to be executed, thereby making it possible to improve the drivability.

The vehicle control apparatus according to the present embodiment is further adapted to change the deceleration threshold value based on the towing information, thereby making it possible to accurately estimate the driver's intention to have the reduction control changed selectively to be executed or not to be executed, thereby making it possible to improve the drivability.

The vehicle control apparatus according to the present embodiment is further adapted to change the deceleration threshold value based on the atmospheric pressure. This makes it possible to accurately estimate the driver's intention to have the reduction control changed selectively to be executed or not to be executed, thereby making it possible to improve the drivability, even if there are possibility, for example, the amount of intake air of the engine, especially the amount of oxygen required for combustion is varied by the atmospheric pressure change to have the driving force varied, and the braking force is affected in case of an extremely light vehicle.

The vehicle control apparatus according to the present embodiment is further adapted to detect the elevation of the vehicle position based on the position information of the vehicle 10 and the map information stored in advance, and to change the deceleration threshold value based on the elevation of the detected vehicle position. This makes it possible to accurately estimate the driver's intention to have the reduction control changed selectively to be executed or not to be executed, thereby making it possible to improve the drivability.

While the previously mentioned embodiments have been explained about the vehicle 10 with an engine 12 functioning as a power source using gasoline as a fuel, the present invention is not limited to these embodiments, but the present invention can be applied to an electric vehicle having one or more electrical motors as power sources, a hydrogen automobile having a power source of an engine using hydrogen as a fuel, and a hybrid vehicle using both an engine and an electric motor as power sources. In these cases, the power source to lower the torque is not limited to the engine 12, but the driving force of the electric motor may be lowered according to the present invention.

While the previously mentioned embodiments each including only one ECU have been explained, the invention is not limited to these embodiments, but the vehicle control apparatus may be constructed with a plurality of ECUs according to the present invention. For example, the ECU 100 forming part of each of the above described embodiments may be constructed by a plurality of ECUs such as an E-ECU that executes the combustion control of the engine 12, and a T-ECU that executes the transmission control of the automatic transmission 13 according to the present invention. In this case, each of the above ECUs may be operative to be held in communication with other ECUs for mutual input and output of necessary information.

As will be understood from the foregoing description, the vehicle control apparatus according to the present invention has such an advantageous effect that the vehicle control apparatus is operative to accurately estimate the driver's intention, and to determine to selectively execute or not execute the reduction control, thereby making it possible to improve the drivability. The vehicle control apparatus according to the present invention is therefore useful as a vehicle control apparatus that performs the suppression control of the output of a power source.

REFERENCE SIGNS LIST

10: vehicle
12: engine (power source)
13: automatic transmission
14: front differential mechanism
15: rear differential mechanism
16: transfer
17L, 17R: front wheel
18L, 18R: rear wheel
21: propeller shaft
22L, 22R: front drive shaft
23L, 23R: rear drive shaft 24L, 24R, 25L, 25R: brake device
26: brake booster (booster)
41: differential gear case
53: transfer clutch
100: ECU (output control unit, threshold value setting unit)
110: hydraulic pressure control device
120: operation panel
131: crank sensor
142: accelerator sensor (drive state detection unit, accelerator detection unit)
143: FB sensor (drive state detection unit, brake detection unit, depression number detection unit)
145: throttle sensor
160: vehicle speed sensor
163: transfer input rotation speed sensor
164: transfer output rotation speed sensor
165: distribution SW sensor
166: inclination detection sensor (vehicle inclination detection unit)
167: vehicle weight sensor (vehicle weight detection unit)
168: towing SW sensor (towing information detection unit)
169: atmospheric pressure sensor (atmospheric pressure detection unit)
170: navigation system (gradient detection unit, elevation detection unit)
212: accelerator pedal
213: foot brake pedal
215: power changing switch
216: towing SW
221: negative pressure sensor (negative pressure detection unit)

The invention claimed is:

1. A vehicle control apparatus for a vehicle provided with a drive source, an accelerator pedal, and a brake pedal, the vehicle control apparatus comprising:
a drive state detection unit that detects a drive state of the vehicle including a driving force request amount of a driving force outputted from the drive source,
an output control unit that executes a reduction control of reducing the driving force outputted from the drive source with respect to the driving force request amount, and
a threshold value setting unit that sets a determination threshold value to determine a driver's braking intention on the basis of the correlation between the driving force request amount and the braking force request amount requested by a driver, and a travel state of the vehicle caused by the driving force request amount and the braking force request amount,
the drive state detection unit having an accelerator detection unit that detects the depression of the accelerator pedal, and a brake detection unit that detects the depression of the brake pedal,
the threshold value setting unit being operative to change the determination threshold value on the basis of the drive state detected by the drive state detection unit, and
the output control unit being operative to execute the reduction control when the depression of the accelerator pedal is detected by the accelerator detection unit, the depression of the brake pedal is detected by the brake detection unit, and the driver's braking intention is determined by comparing the travel state calculated on the basis of the drive state detected by the drive state detection unit with the determination threshold value, and not to execute the reduction control when the depression of the accelerator pedal is not detected by the accelerator detection unit, or when the depression of the brake pedal is not detected by the brake detection unit, or when no driver's braking intention is determined by the output control unit.

2. A vehicle control apparatus as set forth in claim 1, in which
the threshold value setting unit is operative to define an acceleration of the vehicle as the travel state of the vehicle to set the determination threshold value of the acceleration, and to change the determination threshold value of the acceleration on the basis of the drive state detected by the drive state detection unit, and
the output control unit is operative to compare the acceleration calculated on the basis of the drive state detected by the drive state detection unit with the determination threshold value of the acceleration to determine the driver's braking intention.

3. A vehicle control apparatus as set forth in claim 1, in which
the threshold value setting unit is operative to define the vehicle speed of the vehicle as the travel state of the vehicle to set the determination threshold value of the vehicle speed, and to change the determination threshold value of the vehicle speed on the basis of the drive state detected by the drive state detection unit, and
the output control unit is operative to compare the vehicle speed calculated on the basis of the drive state detected by the drive state detection unit with the determination threshold value of the vehicle speed to determine the driver's braking intention.

4. A vehicle control apparatus as set forth in claim 1, in which
the drive state detection unit has a negative pressure detection unit that detects a negative pressure in a booster to assist the depression of the brake pedal by utilizing the negative pressure, and
the threshold value setting unit is operative to change the determination threshold value on the basis of the negative pressure detected by the negative pressure detection unit.

5. A vehicle control apparatus as set forth in claim 1, in which
the drive state detection unit has a brake pedal depression number detection unit that detects the number of the brake pedal depressions, and
the threshold value setting unit is operative to change the determination threshold value on the basis of the number of the brake pedal depressions detected by the brake pedal depression number detection unit.

6. A vehicle control apparatus as set forth in claim 1, in which
the drive state detection unit has a vehicle inclination detection unit that detects a vehicle inclination state, and
the threshold value setting unit is operative to change the determination threshold value on the basis of the vehicle inclination state detected by the vehicle inclination detection unit.

7. A vehicle control apparatus as set forth in claim 1, in which
the drive state detection unit has a gradient detection unit that detects vehicle position information of the vehicle to detect a gradient of the vehicle position on the basis of the vehicle position information and map information preliminarily memorized, and
the threshold value setting unit is operative to change the determination threshold value on the basis of the gradient state of the vehicle position detected by the gradient detection unit.

8. A vehicle control apparatus as set forth in claim 1, in which
the drive state detection unit has a vehicle weight detection unit that detects a vehicle weight of the vehicle, and
the threshold value setting unit is operative to change the determination threshold value on the basis of the vehicle weight detected by the vehicle weight detection unit.

9. A vehicle control apparatus as set forth in claim 1, in which
the drive state detection unit has a vehicle towing information detection unit that detects vehicle towing information of the vehicle, and
the threshold value setting unit is operative to change the determination threshold value on the basis of the vehicle towing information detected by the vehicle towing information detection unit.

10. A vehicle control apparatus as set forth in claim 1, in which
the drive state detection unit has an atmospheric pressure detection unit that detects an atmospheric pressure, and
the threshold value setting unit is operative to change the determination threshold value on the basis of the atmospheric pressure detected by the atmospheric pressure detection unit.

11. A vehicle control apparatus as set forth in claim 1, in which
the drive state detection unit has an elevation detection unit that detects the vehicle position information of the vehicle to detect an elevation of the vehicle position on the basis of the vehicle position information and map information preliminarily memorized, and
the threshold value setting unit is operative to change the determination threshold value on the basis of the elevation of the vehicle position detected by the elevation detection unit.

* * * * *